(12) United States Patent
Husain et al.

(10) Patent No.: US 12,481,454 B2
(45) Date of Patent: Nov. 25, 2025

(54) APPARATUS, METHOD AND SYSTEM TO IMPLEMENT A DUAL VDM SCHEME ON A THREE-DIMENSIONAL MEMORY ARCHITECTURE

(71) Applicant: Intel Corporation, Santa Clara, CA (US)

(72) Inventors: Yasir Mohsin Husain, Folsom, CA (US); Xuming Zhao, Folsom, CA (US); Kevin E. Arendt, Orangevale, CA (US); Sandeep Kumar Guliani, Folsom, CA (US)

(73) Assignee: Intel Corporation, Santa Clara, CA (US)

( * ) Notice: Subject to any disclaimer, the term of this patent is extended or adjusted under 35 U.S.C. 154(b) by 745 days.

(21) Appl. No.: 17/693,199

(22) Filed: Mar. 11, 2022

(65) Prior Publication Data
US 2023/0289099 A1  Sep. 14, 2023

(51) Int. Cl.
*G11C 16/10* (2006.01)
*G06F 3/06* (2006.01)
*G11C 13/00* (2006.01)

(52) U.S. Cl.
CPC .......... *G06F 3/0659* (2013.01); *G06F 3/0604* (2013.01); *G06F 3/0679* (2013.01); *G11C 13/0004* (2013.01); *G11C 13/0038* (2013.01); *G11C 13/004* (2013.01); *G11C 13/0097* (2013.01); *G11C 13/0026* (2013.01); *G11C 13/0028* (2013.01)

(58) Field of Classification Search
CPC .... G06F 3/0659; G06F 3/0604; G06F 3/0679; G11C 13/0004; G11C 13/0038; G11C 13/004; G11C 13/0097; G11C 13/0026; G11C 13/0028
See application file for complete search history.

(56) References Cited

U.S. PATENT DOCUMENTS

| | | | |
|---|---|---|---|
| 10,311,921 B1 * | 6/2019 | Parkinson | G11C 13/0004 |
| 11,367,484 B1 * | 6/2022 | Lee | G11C 13/0033 |
| 2021/0104551 A1 * | 4/2021 | Lin | H01L 23/38 |

\* cited by examiner

*Primary Examiner* — Min Huang
(74) *Attorney, Agent, or Firm* — Alliance IP, LLC

(57) ABSTRACT

An apparatus, system and method. The apparatus is to be coupled to a memory array of a memory device. The apparatus, in response to a determination of a set command to be implemented on first memory cells of the memory array, is to control an execution of a set pre-read operation on the first memory cells by causing application, by a voltage source, of a first demarcation voltage VDM0 across each of the first memory cells during a set pre-read time period. The apparatus is further to, in response to a determination of a reset command to be implemented on second memory cells of the memory array, control an execution of a reset pre-read operation on the second memory cells by causing application, by the voltage source, of a second demarcation voltage VDM3 across each of the second memory cells during a reset pre-read time period, wherein the set pre-read time period and the reset pre-read time period do not overlap, the voltage source to supply a single voltage value at any given time.

20 Claims, 9 Drawing Sheets

US 12,481,454 B2

APPARATUS, METHOD AND SYSTEM TO IMPLEMENT A DUAL VDM SCHEME ON A THREE-DIMENSIONAL MEMORY ARCHITECTURE

FIELD

The present disclosure relates in general to the field of computer development, and more specifically, to performing write using dual demarcation voltage schemes across memory cells of a memory array in a three-dimensional (3D) memory architecture.

BACKGROUND

A dual read demarcation voltage (dual VDM) mechanism as applied to the memory circuitry of a 3D memory architecture during a pre-read algorithm that precedes and is related to a write operation provides different read demarcation voltages (VDMs) to the memory cell to be read (and therefore to bits to be set and the bits to be reset).

Mechanisms are needed to improve dual VDM mechanisms as memory technology progresses.

BRIEF DESCRIPTION OF THE DRAWINGS

Like reference numbers and designations in the various drawings indicate like elements.

DETAILED DESCRIPTION

Figure 1:
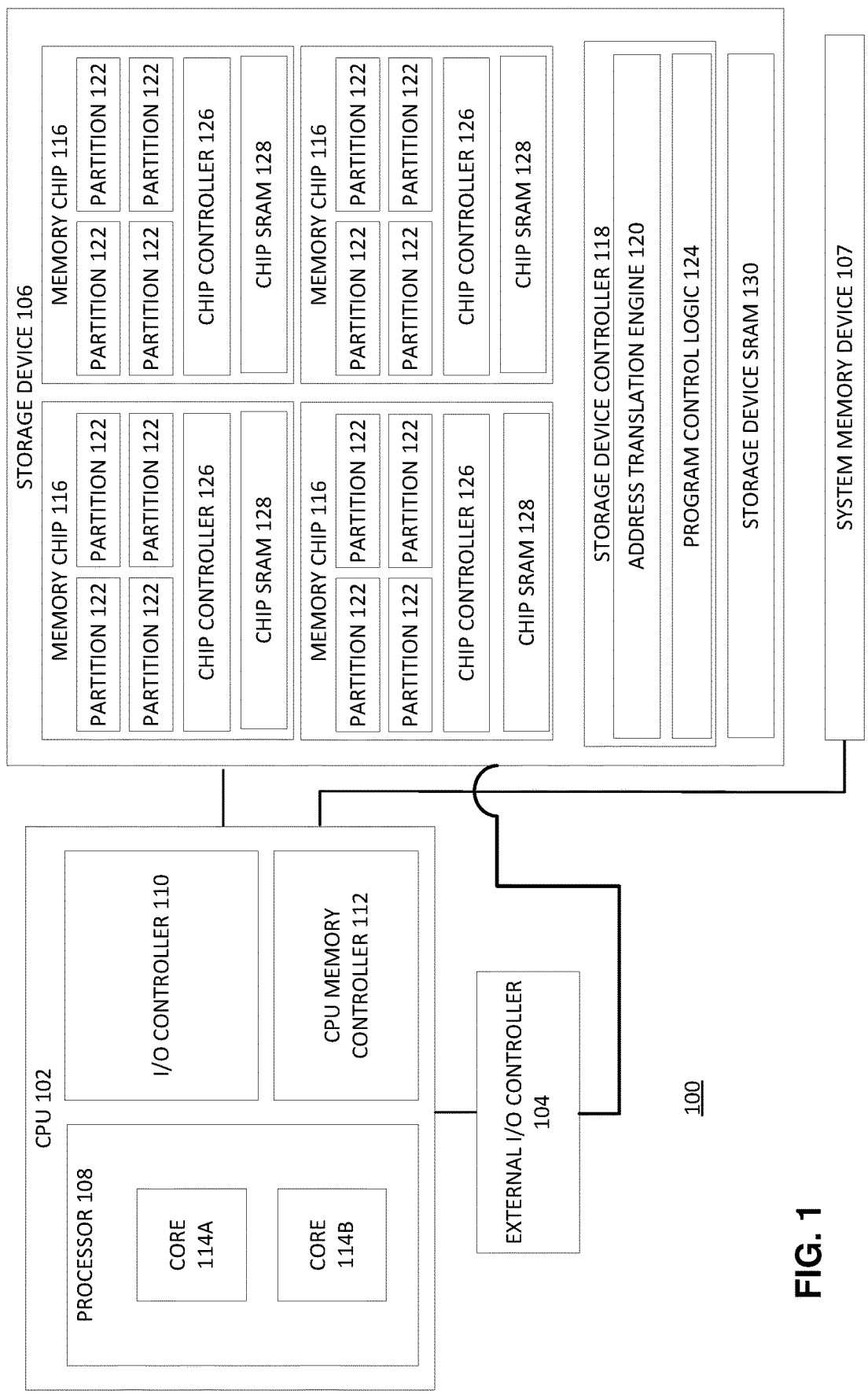
FIG. 1 is a schematic illustration of a block diagram of components of a computer system according to some embodiments.

Some embodiments provide an apparatus, system and method. The apparatus is to be coupled to a memory array of a memory device. The apparatus includes one or more processors to: in response to a determination of a set command to be implemented on first memory cells of the memory array, control an execution of a set pre-read operation on the first memory cells by causing application, by a voltage source, of a first demarcation voltage VDM0 across each of the first memory cells during a set pre-read time period. The one or more processors are further to, in response to a determination of a reset command to be implemented on second memory cells of the memory array, control an execution of a reset pre-read operation on the second memory cells by causing application, by the voltage source, of a second demarcation voltage VDM3 across each of the second memory cells during a reset pre-read time period, wherein the set pre-read time period and the reset pre-read time period do not overlap, the voltage source to supply a single voltage value at any given time.

Advantageously, some embodiments do away multiple transistors per wordlines or bitline, with associated switches and level shifters of dual VDM architectures of the prior art, in this manner leading to space saving with respect to control and drive circuitries to effect dual VDM, and allowing 3D memory architectures to scale more readily.

When a write command, such as a set command or a reset command, is sent to a memory controller to be applied to a memory cell, a pre-read algorithm is used as part of the write operation prior to the write being implemented on the cell. As noted previously, a pre-read command is to first clean up any tail bits in the cell voltage distribution, and to thus prevent data corruption.

The prior art implements dual VDM architecture with a two source follower (SF) scheme to provide two VDM voltages: one is used for pre-read of a cell based on a set command for the cell, the other one is used for pre-read of a cell based on a reset command for the cell. The two SF scheme is implemented in the prior art in part on a partition level, and in part on a tile level. At a tile level, each SF of the two SF scheme has one enable switch and a level shifter to drive the switch. At a partition level (noting that a partition includes a number of tiles, and a tile includes a number of memory cells in a 3D memory architecture), each SF has one capacitive digital-to-analog converter (CDAC) to generate VDM bias voltage, with the CDAC being shared by all the tiles inside the partition.

More details will be provided below o the dual VDM architecture of the prior art further below in relation to FIG. 6A.

Advantageously, embodiments, by replacing a two SF scheme with a single SF scheme for a dual VDM read solution, provide an architecture that occupies a reduced area while achieving a same functionality as that of the prior art, allowing application of the dual VDM scheme to 3D memory devices as those devices scale.

Although the drawings depict particular computer systems, the concepts of various embodiments are applicable to any suitable computer systems. Examples of systems in which teachings of the present disclosure may be used include desktop computer systems, server computer systems, storage systems, handheld devices, tablets, other thin notebooks, system on a chip (SOC) devices, and embedded applications. Some examples of handheld devices include cellular phones, digital cameras, media players, personal digital assistants (PDAs), and handheld PCs. Embedded applications may include microcontrollers, digital signal processors (DSPs), SOCs, network computers (NetPCs), set-top boxes, network hubs, wide area networks (WANs) switches, or any other system that can perform the functions and operations taught below. Various embodiments of the present disclosure may be used in any suitable computing environment, such as a personal computing device, a server, a mainframe, a cloud computing service provider infrastructure, a datacenter, a communications service provider infrastructure (e.g., one or more portions of an Evolved Packet Core), or other environment comprising one or more computing devices.

FIG. 1 illustrates a block diagram of components of a computer system 100 in accordance with some embodiments. System 100 includes a central processing unit (CPU) 102 coupled to an external input/output (I/O) controller 104, a storage device 106 such as a solid state drive (SSD), and system memory device 107. During operation, data may be transferred between a storage device 106 and/or system memory device 107 and the CPU 102. In various embodiments, particular memory access operations (e.g., read and write operations) involving a storage device 106 or system memory device 107 may be issued by an operating system and/or other software applications executed by processor 108. In various embodiments, a storage device 106 may include a storage device controller 118 and one or more memory chips 116 that each comprise any suitable number of memory partitions 122.

In various embodiments, a memory partition may include a 3D crosspoint memory array. In some embodiments, a 3D crosspoint memory array may comprise a transistor-less (i.e., at least with respect to the data storage elements of the memory) stackable crosspoint architecture in which memory cells sit at the intersection of row address lines and column address lines arranged in a grid.

CPU 102 comprises a processor 108, such as a microprocessor, an embedded processor, a DSP, a network processor, a handheld processor, an application processor, a co-processor, an SOC, or other device to execute code (i.e., software instructions). Processor 108, in the depicted embodiment, includes two processing elements (cores 114A and 114B in the depicted embodiment), which may include asymmetric processing elements or symmetric processing elements. However, a processor may include any number of processing elements that may be symmetric or asymmetric. CPU 102 may be referred to herein as a host computing device (though a host computing device may be any suitable computing device operable to issue memory access commands to a storage device 106).

In one embodiment, a processing element refers to hardware or logic to support a software thread. Examples of hardware processing elements include: a thread unit, a thread slot, a thread, a process unit, a context, a context unit, a logical processor, a hardware thread, a core, and/or any other element, which is capable of holding a state for a processor, such as an execution state or architectural state. In other words, a processing element, in one embodiment, refers to any hardware capable of being independently associated with code, such as a software thread, operating system, application, or other code. A physical processor (or processor socket) typically refers to an integrated circuit, which potentially includes any number of other processing elements, such as cores or hardware threads.

A core 114 (e.g., 114A or 114B) may refer to logic located on an integrated circuit capable of maintaining an independent architectural state, wherein each independently maintained architectural state is associated with at least some dedicated execution resources. A hardware thread may refer to any logic located on an integrated circuit capable of maintaining an independent architectural state, wherein the independently maintained architectural states share access to execution resources. As can be seen, when certain resources are shared and others are dedicated to an architectural state, the line between the nomenclature of a hardware thread and core overlaps. Yet often, a core and a hardware thread are viewed by an operating system as individual logical processors, where the operating system is able to individually schedule operations on each logical processor.

In various embodiments, the processing elements may also include one or more arithmetic logic units (ALUs), floating point units (FPUs), caches, instruction pipelines, interrupt handling hardware, registers, or other hardware to facilitate the operations of the processing elements.

I/O controller 110 is an integrated I/O controller that includes logic for communicating data between CPU 102 and I/O devices, which may refer to any suitable logic capable of transferring data to and/or receiving data from an electronic system, such as CPU 102. For example, an I/O device may comprise an audio/video (A/V) device controller such as a graphics accelerator or audio controller; a data storage device controller, such as a flash memory device, magnetic storage disk, or optical storage disk controller; a wireless transceiver; a network processor; a network interface controller; or a controller for another input device such as a monitor, printer, mouse, keyboard, or scanner; or other suitable device. In a particular embodiment, an I/O device may comprise storage device controller 118 of storage device 106 coupled to the CPU 102 through I/O controller 110.

An I/O device may communicate with the I/O controller 110 of the CPU 102 using any suitable signaling protocol, such as peripheral component interconnect (PCI), PCI Express (PCIe), Universal Serial Bus (USB), Serial Attached SCSI (SAS), Serial ATA (SATA), Fibre Channel (FC), IEEE 802.3, IEEE 802.11, or other current or future signaling protocol. In particular embodiments, I/O controller 110 and the underlying I/O device may communicate data and commands in accordance with a logical device interface specification such as Non-Volatile Memory Express (NVMe) (e.g., as described by one or more of the specifications available at www.nvmexpress.org/specifications/) or Advanced Host Controller Interface (AHCI) (e.g., as described by one or more AHCI specifications such as Serial ATA AHCI: Specification, Rev. 1.3.1 available at http://www.intel.com/content/www/us/en/io/serial-ata/serial-ata-ahci-spec-rev 1-3-1.html). In various embodiments, I/O devices coupled to the I/O controller may be located off-chip (i.e., not on the same chip as CPU 102) or may be integrated on the same chip as the CPU 102.

CPU memory controller 112 is an integrated memory controller that includes logic to control the flow of data going to and from one or more system memory devices 107. CPU memory controller 112 may include logic operable to read from a system memory device 107, write to a system memory device 107, or to request other operations from a system memory device 107. In various embodiments, CPU memory controller 112 may receive write requests from cores 114 and/or I/O controller 110 and may provide data specified in these requests to a system memory device 107 for storage therein. CPU memory controller 112 may also read data from a system memory device 107 and provide the read data to I/O controller 110 or a core 114. During operation, CPU memory controller 112 may issue commands including one or more addresses of the system memory device 107 in order to read data from or write data to memory (or to perform other operations). In some embodiments, CPU memory controller 112 may be implemented on the same chip as CPU 102, whereas in other embodiments, CPU memory controller 112 may be implemented on a different chip than that of CPU 102. I/O controller 110 may perform similar operations with respect to one or more storage devices 106.

The CPU 102 may also be coupled to one or more other I/O devices through external I/O controller 104. In a particular embodiment, external I/O controller 104 may couple a storage device 106 to the CPU 102. External I/O controller 104 may include logic to manage the flow of data between one or more CPUs 102 and I/O devices. In particular embodiments, external I/O controller 104 is located on a motherboard along with the CPU 102. The external I/O controller 104 may exchange information with components of CPU 102 using point-to-point or other interfaces.

A system memory device 107 may store any suitable data, such as data used by processor 108 to provide the functionality of computer system 100. For example, data associated with programs that are executed or files accessed by cores 114 may be stored in system memory device 107. Thus, a system memory device 107 may include a system memory that stores data and/or sequences of instructions that are executed or otherwise used by the cores 114. In various embodiments, a system memory device 107 may store persistent data (e.g., a user's files or instruction sequences) that maintains its state even after power to the system memory device 107 is removed. A system memory device 107 may be dedicated to a particular CPU 102 or shared with other devices (e.g., one or more other processors or other devices) of computer system 100.

In various embodiments, a system memory device 107 may include a memory comprising any number of memory partitions, a memory device controller, and other supporting logic (not shown). A memory module may include non-volatile memory and/or volatile memory.

Non-volatile memory is a storage medium that does not require power to maintain the state of data stored by the medium. In various embodiments, non-volatile memory may be byte or block addressable. Nonlimiting examples of nonvolatile memory may include any or a combination of: solid state memory (such as planar or 3-dimensional (3D) NAND flash memory or NOR flash memory), 3D crosspoint memory, phase change memory or SXP memory (e.g., memory that uses a chalcogenide glass phase change material in the memory cells), ferroelectric memory, silicon-oxide-nitride-oxide-silicon (SONOS) memory, polymer memory (e.g., ferroelectric polymer memory), ferroelectric transistor random access memory (Fe-TRAM) ovonic memory, anti-ferroelectric memory, nanowire memory, electrically erasable programmable read-only memory (EEPROM), a memristor, single or multi-level phase change memory (PCM), Spin Hall Effect Magnetic RAM (SHE-MRAM), and Spin Transfer Torque Magnetic RAM (STTRAM), a resistive memory, magnetoresistive random access memory (MRAM) memory that incorporates memristor technology, resistive memory including the metal oxide base, the oxygen vacancy base and the conductive bridge Random Access Memory (CB-RAM), a spintronic magnetic junction memory based device, a magnetic tunneling junction (MTJ) based device, a DW (Domain Wall) and SOT (Spin Orbit Transfer) based device, a thiristor based memory device, or a combination of any of the above, or other memory.

Volatile memory is a storage medium that requires power to maintain the state of data stored by the medium. Non-limiting examples of volatile memory may include several types of random access memory (RAM), such as dynamic random access memory (DRAM) or static random access memory (SRAM). One particular type of DRAM that may be used in a memory module is synchronous dynamic random access memory (SDRAM). In some embodiments, any portion of memory 107 that is volatile memory can comply with JEDEC standards including but not limited to Double Data Rate (DDR) standards, e.g., DDR3, 4, and 5, or Low Power DDR4 (LPDDR4) as well as emerging standards.

A storage device 106 may store any suitable data, such as data used by processor 108 to provide functionality of computer system 100. For example, data associated with programs that are executed or files accessed by cores 114A and 114B may be stored in storage device 106. In various embodiments, a storage device 106 may store persistent data (e.g., a user's files or software application code) that maintains its state even after power to the storage device 106 is removed. A storage device 106 may be dedicated to CPU 102 or shared with other devices (e.g., another CPU or other device) of computer system 100.

In the embodiment depicted, storage device 106 includes a storage device controller 118 and four memory chips 116 each comprising four memory partitions 122 operable to store data, however, a storage device may include any suitable number of memory chips each having any suitable number of memory partitions. A memory partition 122 includes a plurality of memory cells operable to store data. The cells of a memory partition 122 may be arranged in any suitable fashion, such as in rows (e.g., wordlines) and columns (e.g., bitlines), three dimensional structures, sectors, or in other ways. In various embodiments, the cells may be logically grouped into banks, blocks, subblocks, wordlines, pages, frames, bytes, slices, or other suitable groups. In various embodiments, a memory partition 122 may include any of the volatile or non-volatile memories listed above or other suitable memory. In a particular embodiment, each memory partition 122 comprises one or more 3D crosspoint memory arrays. 3D crosspoint arrays are described in more detail in connection with the following figures.

In various embodiments, storage device 106 may comprise a solid state drive; a memory card; a Universal Serial Bus (USB) drive; a Non-Volatile Dual In-line Memory Module (NVDIMM); storage integrated within a device such as a smartphone, camera, or media player; or other suitable mass storage device.

In a particular embodiment, one or more memory chips 116 are embodied in a semiconductor package. In various embodiments, a semiconductor package may comprise a casing comprising one or more semiconductor chips (also referred to as dies). A package may also comprise contact pins or leads used to connect to external circuits. In various embodiments, a memory chip may include one or more memory partitions 122.

Accordingly, in some embodiments, storage device 106 may comprise a package that includes a plurality of chips that each include one or more memory partitions 122. However, a storage device 106 may include any suitable arrangement of one or more memory partitions and associated logic in any suitable physical arrangement. For example, memory partitions 122 may be embodied in one or more different physical mediums, such as a circuit board, semiconductor package, semiconductor chip, disk drive, other medium, or any combination thereof.

Storage device 106 may include any suitable interface to communicate with CPU memory controller 112 or I/O controller 110 using any suitable communication protocol such as a DDR-based protocol, PCI, PCIe, USB, SAS, SATA, FC, System Management Bus (SMBus), or other suitable protocol. A storage device 106 may also include a communication interface to communicate with CPU memory controller 112 or I/O controller 110 in accordance with any suitable logical device interface specification such as NVMe, AHCI, or other suitable specification. In particular embodiments, storage device 106 may comprise multiple communication interfaces that each communicate using a separate protocol with CPU memory controller 112 and/or I/O controller 110.

Storage device controller 118 may include logic to receive requests from CPU 102 (e.g., via CPU memory controller 112 or I/O controller 110), cause the requests to be carried out with respect to the memory chips 116, and provide data associated with the requests to CPU 102 (e.g., via CPU memory controller 112 or I/O controller 110). Controller 118 may also be operable to detect and/or correct errors encountered during memory operations via an error correction code (ECC engine). In an embodiment, controller 118 also tracks, e.g., via a wear leveling engine, the number of times particular cells (or logical groupings of cells) have been written to in order to perform wear leveling, detect when cells are nearing an estimated number of times they may be reliably written to, and/or adjust read operations based on the number of times cells have been written to. In performing wear leveling, the storage device controller 118 may evenly spread out write operations among the cells of memory chips 116 in an attempt to equalize the number of operations (e.g., write operations) performed by each cell. In various embodiments, controller 118 may also monitor various characteristics of the storage device 106 such as the temperature or voltage and report associated statistics to the CPU 102. Storage device controller 118 can be implemented on the same circuit board or device as the memory chips 116 or on a different circuit board or device. For example, in some environments, storage device controller 118 may be a centralized storage controller that manages memory operations for multiple different storage devices 106 of computer system 100.

In various embodiments, the storage device 106 also includes program control logic 124 which is operable to control the programming sequence performed when data is written to or read from a memory chip 116. In various embodiments, program control logic 124 may provide the various voltages (or information indicating which voltages should be provided) that are applied to memory cells during the programming and/or reading of data (or perform other operations associated with read or program operations), perform error correction, and perform other suitable functions.

In various embodiments, the program control logic 124 may be integrated on the same chip as the storage device controller 118 or on a different chip. In the depicted embodiment, the program control logic 124 is shown as part of the storage device controller 118, although in various embodiments, all or a portion of the program control logic 124 may be separate from the storage device controller 118 and communicably coupled to the storage device controller 118. For example, all or a portion of the program control logic 124 described herein may be located on a memory chip 116. In various embodiments, reference herein to a "controller" may refer to any suitable control logic, such as storage device controller 118, chip controller 126, or a partition controller. In some embodiments, reference to a controller may contemplate logic distributed on multiple components, such as logic of a storage device controller 118, chip controller 126, and/or a partition controller.

In various embodiments, storage device controller 118 may receive a command from a host device (e.g., CPU 102), determine a target memory chip for the command, and communicate the command to a chip controller 126 of the target memory chip. In some embodiments, the storage device controller 118 may modify the command before sending the command to the chip controller 126.

In various embodiments, the storage device controller 118 may send commands to memory chips 116 to perform host-initiated read operations as well as device-initiated read operations. A host-initiated read operation may be performed in response to reception of a read command from a host coupled to the storage device 106, such as CPU 102. A device-initiated read operation may be a read operation that is performed in response to a device-initiated read command generated by the storage device 106 independent of receiving a read command from the host. In various embodiments, the storage device controller 118 may be the component that generates device-initiated read commands. The storage device 106 may initiate a device-initiated read command for any suitable reason. For example, upon power up of a storage device, the storage device 106 may initiate a plurality of read and write-back commands to re-initialize data of the storage device 106 (e.g., to account for any drift that has occurred while the storage device 106 or a portion thereof was powered off or has sat idle for a long period of time).

The chip controller 126 may receive a command from the storage device controller 118 and determine a target memory partition 122 for the command. The chip controller 126 may then send the command to a controller of the determined memory partition 122. In various embodiments, the chip controller 126 may modify the command before sending the command to the controller of the partition 122.

In some embodiments, all or some of the elements of system 100 are resident on (or coupled to) the same circuit board (e.g., a motherboard). In various embodiments, any suitable partitioning between the elements may exist. For example, the elements depicted in CPU 102 may be located on a single die (i.e., on-chip) or package or any of the elements of CPU 102 may be located off-chip or off-package. Similarly, the elements depicted in storage device 106 may be located on a single chip or on multiple chips. In various embodiments, a storage device 106 and a computing host (e.g., CPU 102) may be located on the same circuit board or on the same device and in other embodiments the storage device 106 and the computing host may be located on different circuit boards or devices.

The components of system 100 may be coupled together in any suitable manner. For example, a bus may couple any of the components together. A bus may include any known interconnect, such as a multi-drop bus, a mesh interconnect, a ring interconnect, a point-to-point interconnect, a serial interconnect, a parallel bus, a coherent (e.g. cache coherent) bus, a layered protocol architecture, a differential bus, and a Gunning transceiver logic (GTL) bus. In various embodiments, an integrated I/O subsystem includes point-to-point multiplexing logic between various components of system 100, such as cores 114, one or more CPU memory controllers 112, I/O controller 110, integrated I/O devices, direct memory access (DMA) logic (not shown), etc. In various embodiments, components of computer system 100 may be coupled together through one or more networks comprising any number of intervening network nodes, such as routers, switches, or other computing devices. For example, a computing host (e.g., CPU 102) and the storage device 106 may be communicably coupled through a network.

Although not depicted, system 100 may use a battery and/or power supply outlet connector and associated system to receive power, a display to output data provided by CPU 102, or a network interface allowing the CPU 102 to communicate over a network. In various embodiments, the battery, power supply outlet connector, display, and/or network interface may be communicatively coupled to CPU 102. Other sources of power can be used such as renewable energy (e.g., solar power or motion based power).

Storage device SRAM 130 and chip SRAM 128 each are adapted to execute internal firmware or software of the storage device 106 and memory chip 116 respectively. For example, the logic to be implemented by program control logic 124, upon the issuance of a command, for example from the host or CPU 102 to execute the logic, may be moved from a memory storing the logic to SRAM 130 (such as a NVM—not shown) such that the logic may be executed by the storage device controller 118 which will have access to the logic instructions by way of the associated SRAM 128. Similarly, the logic to be implemented by the chip controller 126, upon the issuance of a command, for example from the host or CPU 102 to execute the logic, may be moved from a memory storage the logic to the associated SRAM 128 (such as a NVM—not shown) such that the logic may be executed by the associated chip controller 126 which will have access to the logic instructions by way of the associated SRAM 128.

Figure 2:
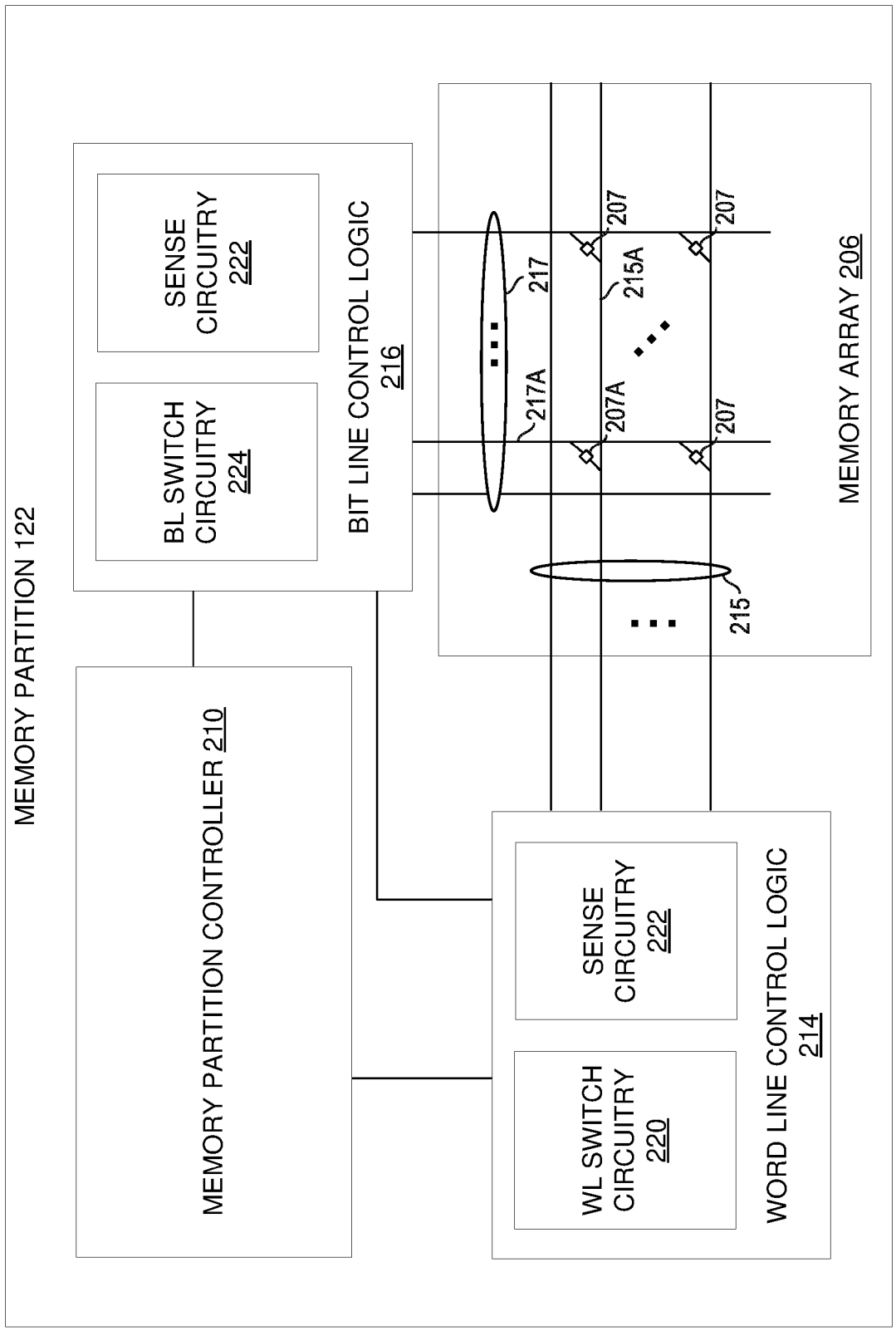
FIG. 2 is a schematic illustration of a memory partition in accordance with certain embodiments.

FIG. 2 illustrates a detailed exemplary view of the memory partition 122 of FIG. 1 in accordance with certain embodiments. In one embodiment, a memory partition 122 may include 3D crosspoint memory which may include phase change memory or other suitable memory types. In a particular embodiment, phase change memory may utilize a chalcogenide material for memory elements. A memory element is a unit of a memory cell that actually stores the information. In operation, phase change memory may store information on the memory element by changing the phase of the memory element between amorphous and crystalline phases. The material of a memory element (e.g., the chalcogenide material) may exhibit either a crystalline or an amorphous phase, exhibiting a low or high conductivity. Generally, the amorphous phase has a low conductivity (high impedance) and is associated with a reset state (logic zero) and the crystalline phase has a high conductivity (low impedance) and is associated with a set state (logic one). The memory element may be included in a memory cell 207 (e.g., a phase change memory cell) that also includes a selector, i.e., a selector device coupled to the memory element. The selector devices are configured to facilitate combining a plurality of memory elements into an array.

In some embodiments, a 3D crosspoint memory array 206 may comprise a transistor-less (i.e., at least with respect to the data storage elements of the memory) stackable crosspoint architecture in which memory cells 207 sit at the intersection of row address lines and column address lines arranged in a grid. The row address lines 215 and column address lines 217, called word lines (WLs) and bit lines (BLs), respectively, cross in the formation of the grid and each memory cell 207 is coupled between a WL and a BL where the WL and BL cross (i.e., crosspoint). At the point of a crossing, the WL and BL may be located at different vertical planes such that the WL crosses over the BL but does not physically touch the BL. As described above, the architecture may be stackable, such that a word line may cross over a bit line located beneath the word line and another bit line for another memory cell located above the word line. It should be noted that row and column are terms of convenience used to provide a qualitative description of the arrangement of WLs and BLs in crosspoint memory. In various embodiments, the cells of the 3D crosspoint memory array may be individually addressable. In some embodiments, bit storage may be based on a change in bulk resistance of a 3D crosspoint memory cell. In various embodiments, 3D crosspoint memory may include any of the characteristics of 3D XPoint memory manufactured by INTEL CORPORATION and/or MICRON TECHNOLOGY, INC.

During a programming operation (i.e., a write operation), the phase of the memory element may be changed by the application of a first bias voltage to the WL and a second bias voltage to the BL resulting in a differential bias voltage across the memory cell that may cause a current to flow in the memory element. The differential bias voltage may be maintained across the memory cell for a time period sufficient to cause the memory element to transition the memory element from the amorphous state to the crystalline state or from the crystalline state to the amorphous state (e.g., via the application of heat produced by an electric current). Snap back is a property of the composite memory element that results in an abrupt change in conductivity and an associated abrupt change in the voltage across the memory element. For example, a "snapback" may be used to refer to an instance where the transition from subthreshold to the threshold or above threshold region of a cell may involve an event where the voltage sustained by the target cell for a given current through the cell is suddenly reduced.

In a read operation, a target memory cell is selected via the application of a first bias voltage to the WL and a second bias voltage to the BL that cross at the target memory cell for a time interval. A resulting differential bias voltage (a demarcation read voltage (VDM)) across the memory element is configured to be greater than a maximum set voltage and less than a minimum reset voltage for the memory element.

In response to application of the VDM, the target memory element may or may not snap back, depending on whether the memory element is in the crystalline state (set) or the amorphous state (reset). Sense circuitry, coupled to the memory element, is configured to detect the presence or absence of snap back in a sensing time interval. The presence of snap back may then be interpreted as a logic one and the absence of snap back as a logic zero.

The differential bias at which a memory cell transitions from being sensed as a logic one (e.g., due to the memory cell snapping back) to being sensed as a logic zero (e.g., due to the memory cell not snapping back), may be termed a threshold voltage (sometimes referred to as a snap back voltage). Thus, when the VDM is higher than the threshold voltage of the memory cell, the memory cell may be sensed as storing a logic one and when the VDM is lower than the threshold voltage of the memory cell, the memory cell may be sensed as storing a logic zero.

In some embodiments, an applied bias such as the VDM of a read pulse may be high enough to only turn on 3D crosspoint cells in the crystalline state, which may have a lower threshold voltage than 3D crosspoint cells in the amorphous state. In some embodiments, the VDM may be supplied through negative and/or positive regulated nodes. For example, the bitline electrode of the 3D crosspoint cell may be a positive regulated node and the wordline electrode coupled to the cell may supply the bias for VDM.

For a write operation or a read operation, one memory cell 207A out of many cells, such as thousands of cells, may be selected as the target cell for the read or write operation, the cell being at the cross section of a BL 217A and a WL 215A. All cells coupled to BL 217A, and all cells coupled to WL 215A other than cell 207A may still see approximately ½ of VDM, with only cell 207A seeing the full VDM.

In the embodiment of FIG. 2, a memory partition 122 includes memory partition controller 210 (or memory controller 210), word line control logic 214, bit line control logic 216, and memory array 206. A host device (e.g., CPU 102) may provide read and/or write commands including memory address(es) and/or associated data to memory partition 122 (e.g., via storage device controller 118 and chip controller 126) and may receive read data from memory partition 122 (e.g., via the chip controller 126 and storage device controller 118). Similarly, storage device controller 118 may provide host-initiated read and write commands or device-initiated read and write commands including memory addresses to memory partition 122 (e.g., via chip controller 126). Memory partition controller 210 (in conjunction with word line control logic 214 and bit line control logic 216) is configured to perform memory access operations, e.g., reading one or more target memory cells and/or writing to one or more target memory cells. Although not depicted, memory partition controller 210 may include an interface to couple the same to the word line control logic (or control circuitry) 214 and bit line control logic (or control circuitry) 216).

Memory array 206 corresponds to at least a portion of a 3D crosspoint memory (e.g., that may include phase change memory cells or other suitable memory cells) and includes a plurality of word lines 215, a plurality of bit lines 217 and a plurality of memory cells, e.g., memory cells 207. Each memory cell is coupled between a word line ("WL") and a bit line ("BL") at a crosspoint of the WL and the BL. Each memory cell includes a memory element configured to store information and may include a memory cell selector device (i.e., selector) coupled to the memory element. Selector devices may include ovonic threshold switches, such as those including glassy films (e.g. Ge—Sb—Se—N (GSSN) glassy thin films/chalcogenide glass thin films), diodes, bipolar junction transistors, field-effect transistors, etc. Memory array 206 may be configured to store binary data and may be written to (i.e., programmed) or read from.

Memory partition controller 210 may manage communications with chip controller 126 and/or storage device controller 118. In a particular embodiment, memory partition controller 210 may analyze one or more signals received from another controller to determine whether a command sent via a bus is to be consumed by the memory partition 122. For example, controller 210 may analyze an address of the command and/or a value on an enable signal line to determine whether the command applies to the memory partition 122. Controller 210 may be configured to identify one or more target WLs and/or BLs associated with a received memory address (this memory address may be a separate address from the memory partition address that identifies the memory partition 122, although in some embodiments a portion of an address field of a command may identify the memory partition while another portion of the address field may identify one or more WLs and/or BLs). Memory partition controller 210 may be configured to manage operations of WL control logic 214 and BL control logic 216 based, at least in part, on WL and/or BL identifiers included in a received command.

WL control logic 214 includes WL switch circuitry 220 and sense circuitry 222. WL control logic 214 is configured to receive target WL address(es) from memory partition controller 210 and to select one or more WLs for reading and/or writing operations. For example, WL control logic 214 may be configured to select a target WL by coupling a WL select bias voltage to the target WL. WL control logic 214 may be configured to deselect a WL by decoupling the target WL from the WL select bias voltage and/or by coupling a WL deselect bias voltage to the WL. WL control logic 214 may be coupled to a plurality of WLs 215 included in memory array 206. Each WL may be coupled to a number of memory cells corresponding to a number of BLs 217. WL switch circuitry 220 may include a plurality of switches, each switch configured to couple (or decouple) a respective WL, e.g., WL 215A, to a WL select bias voltage to select the respective WL 215A. For example, switch circuitry 220 may include a plurality of transistors.

BL control logic 216 includes BL switch circuitry 224. In some embodiments, BL control logic 216 may also include sense circuitry, e.g., sense circuitry 222. BL control logic 216 is configured to select one or more BLs for reading and/or writing operations. BL control logic 216 may be configured to select a target BL by coupling a BL select bias voltage to the target BL. BL control logic 216 may be configured to deselect a BL by decoupling the target BL from the BL select bias voltage and/or by coupling a BL deselect bias voltage to the BL. BL switch circuitry 224 is similar to WL switch circuitry 220 except BL switch circuitry 224 is configured to couple the BL select bias voltage to a target BL.

Sense circuitry 222 is configured to detect the state of one or more sensed memory cells 207 (e.g., via the presence or absence of a snap back event during a sense interval), e.g., during a read operation. Sense circuitry 222 is configured to provide a logic level output related to the result of the read operation to, e.g., memory partition controller 210. For example, a logic level corresponding to a logic one may be output if the applied VDM is higher than the memory cell's threshold voltage or a logic zero if the applied VDM is lower than the memory cell's threshold voltage. In a particular embodiment, a logic one may be output if a snap back is detected and a logic zero may be output if a snap back is not detected.

As an example, in response to a signal from memory partition controller 210, WL control logic 214 and BL control logic 216 may be configured to select one or more target memory cells, e.g., memory cell 207A, for a read operation by coupling WL 215A to WL select bias voltage and BL 217A to BL select bias voltage. One or both of sense circuitries 222 may then be configured to monitor WL 215A and/or BL 217A for a sensing interval in order to determine the state of the memory cell 207A (e.g., to determine whether or not a snap back event occurs). For example, if a sense circuitry 222 detects a snap back event, then memory cell 207A may be in the set state, but if a sense circuitry 222 does not detect a snap back event in the sensing interval, then memory cell 207A may be in the reset state.

Thus, WL control logic 214 and/or BL control logic 216 may be configured to select a target memory cell for a read operation, initiate the read operation, sense the selected memory cell (e.g., for a snap back event) in a sensing interval, and provide the result of the sensing to, e.g., memory partition controller 210.

In a particular embodiment, the sense circuitry 222 may include a wordline (WL) load connected to a WL electrode or gate, and a bitline (BL) load connected to a bitline electrode or gate. When a particular WL and BL are selected in the array, a difference between WL load or WL voltage and the BL voltage correspond to a read VDM. VDM may induce a current in the memory cell 207A, $I_{cell}$. A comparator such as a sense amplifier may compare $I_{cell}$ with a reference current in order to read a logic state one or logic state zero depending on whether the memory cell is a set cell or a reset cell. The reference current may thus be selected such that the current of the target memory cell is lower than the reference current before snapback of the target memory cell and higher than the reference current after snapback of the target memory cell. In this manner, an output of the sense amplifier/comparator may be indicative of a state of the target memory cell. A latch may be coupled to the output of the comparator to store the output of the read operation. In some embodiments, leakage components of the current can be mitigated by respectively selecting a bias for all other unselected wordlines and bitlines that reduces or minimizes leakage. Capacitive components of the current can be mitigated by allowing sufficient time for the capacitive components to dissipate.

For each matrix of arrays, there may be a sense amplifier provided. Each partition 122 may have 128 such matrices, hence 128 sense amplifiers. Each partition may be read from one read operation.

Figure 3:
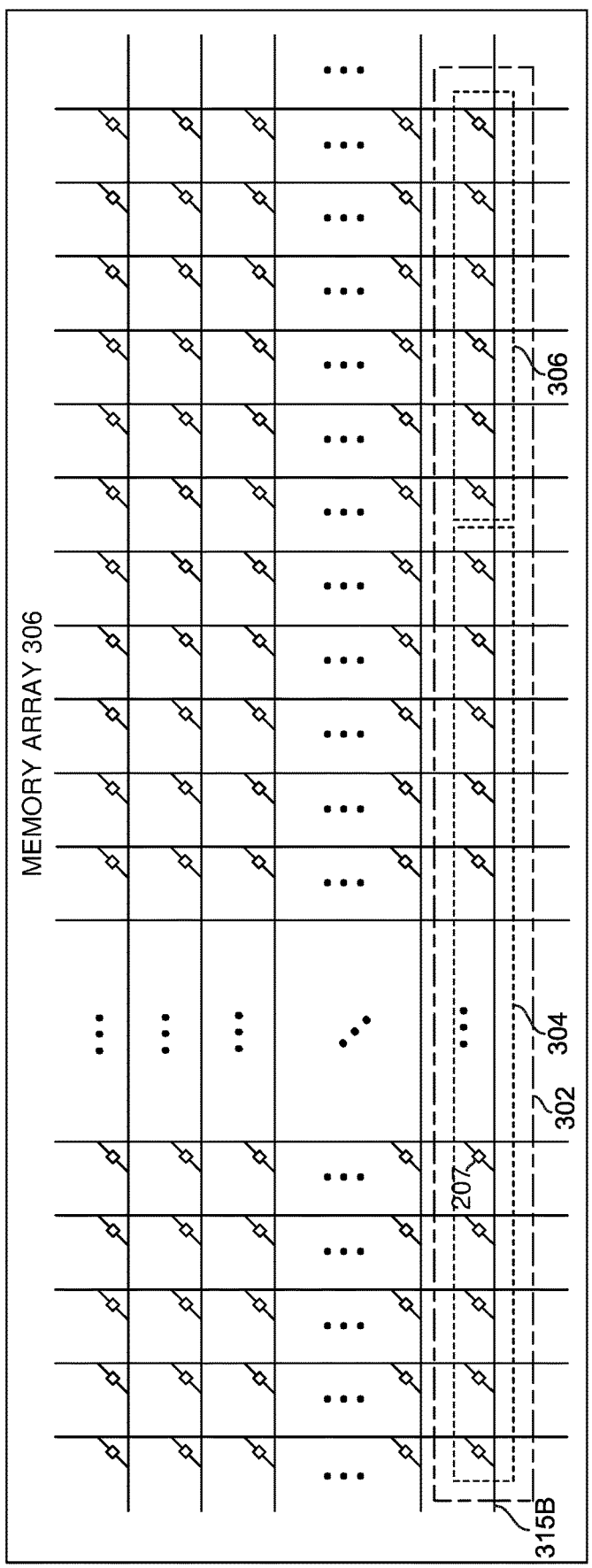
FIG. 3 is a schematic illustration of a memory array in accordance with certain embodiments.

FIG. 3 illustrates a detailed exemplary view of the memory array 206 of FIG. 2 in accordance with certain embodiments. In various embodiments, a plurality of memory cells 207 of memory array 206 may be divided into a logical group such as a slice 302 (and the memory array 206 may include a plurality of slices). In the embodiment depicted, slice 302 includes a plurality of memory cells 207 coupled to the same WL 215A, though a slice 302 may comprise any suitable arrangement of memory cells.

In a particular embodiment, a slice may include a payload portion 304 and a metadata portion 306. The memory cells of the payload portion 304 may store data written to the storage device 106 by a host (e.g., CPU 102/104). For example, the host may send a write command specifying payload data to be written to the storage device 106 at a particular logical address. The payload of the write command may be stored in a payload portion 304 of one or more slices 302 (in various embodiments, the payload portion 304 may be large enough to hold payload data from multiple write commands from the host). In various embodiments, the size of the payload portion of a slice may have any suitable size, such as 1 kibibyte (KiB), 2 KiB, 4 KiB, 8 KiB, or other suitable size.

The memory cells of the metadata portion 306 of a slice 302 may store metadata associated with the payload data stored in the payload portion 304 of the slice 302 or the slice itself. The metadata portion 306 may store any suitable metadata associated with the payload data or slice. For example, the metadata portion 306 may store parity bits and/or cyclic redundancy check (CRC) bits used during error detection and error correction, e.g., by the storage device controller 118. In alternative embodiments, error detection and/or correction may be performed at any suitable level on the storage device 106, such as by the chip controllers 126 or partition controllers 210.

Figure 4:
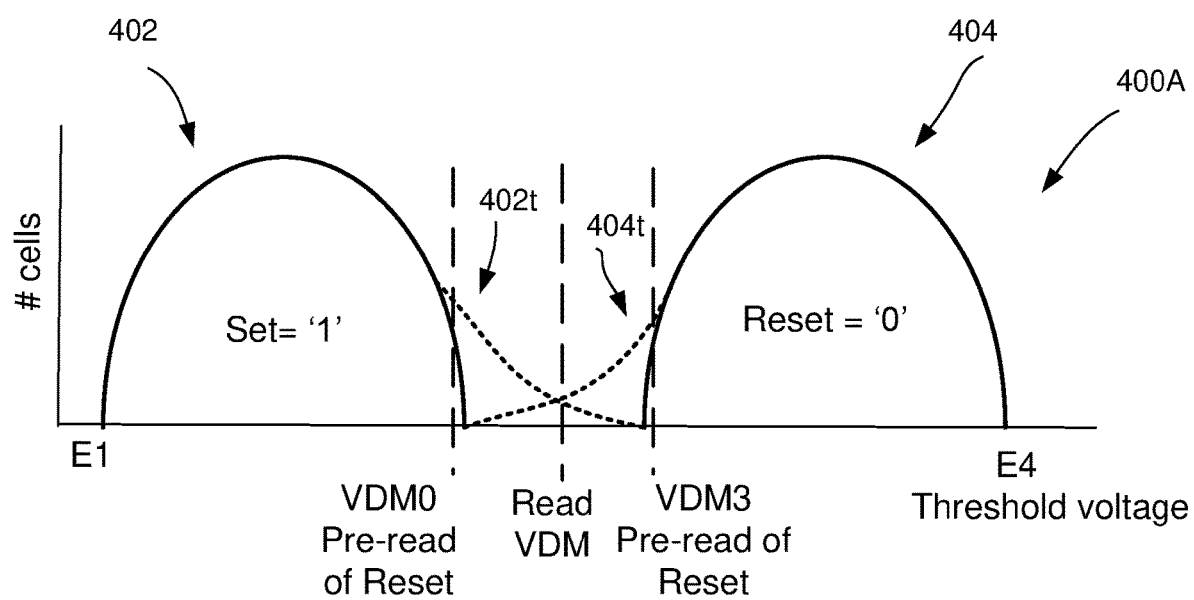
FIG. 4 is a graph depicting memory cell threshold voltage distributions and demarcation voltages in accordance with certain embodiments for a single level cell (SLC) memory including selector devices in individual memory cells thereof.

FIG. 4 illustrates a plot or graph 400 depicting memory cell threshold voltage statistical distributions 402 for set cells (storing a bit 1), and 404 for reset cells (storing a bit 0) (these are meant to represent bell curves for example), and a read voltage "VDM" for a single level cell (SLC).

During a read operation, a differential bias sometimes referred to as a demarcation voltage (VDM) may be applied across the terminals of the memory cell and the memory cell may be sensed based on the reaction of the memory cell to the applied bias. For example, the memory cell may either go into a conductive ON state (logic one) or remain in a weakly conductive OFF state (logic zero). The applied voltage at which a memory cell transitions from being sensed as a logic one to being sensed as a logic zero may be termed a threshold voltage of the memory cell. Thus, as an example, when the VDM is higher than the threshold voltage of the memory cell, the memory cell may be sensed as storing a logic one and when the VDM is lower than the threshold voltage of the memory cell, the memory cell may be sensed as storing a logic zero.

In FIG. 4, the horizontal axis depicts threshold voltages of memory cells of a single level cell array, and the vertical axis depicts bit counts (i.e., number of memory cells). Thus, each point of a distribution 402/404 represents several cells having a particular threshold voltage. The graph 400 assumes that half of the bits of the array is in a set state (i.e., has a threshold voltage lower than the corresponding VDM) and half of the bits is in a reset state (i.e., has a threshold voltage higher than the corresponding VDM). Distributions 402 and 404 represents a baseline distribution that may correspond to a threshold voltage distribution at a particular point in time.

In a read operation, a target memory cell, such as cell 207A, is selected via the application of a first bias voltage to the WL 215A and a second bias voltage to the BL 217A that cross at the target memory cell for a time interval. A resulting differential bias voltage (a demarcation read voltage (VDM)) across the memory element is configured to be greater than a maximum set voltage E2 and less than a minimum reset voltage E3 for the memory element.

In response to application of the VDM, the target cell may or may not snap back, depending on whether the target cell is in the crystalline state (set) or the amorphous state (reset), as suggested in FIG. 4. If the target cell is in a set state, application of the VDM would cause the set cell to snap back, in which case the target cell would be read as a logic one, and if the target cell is in a reset state, application of the VDM, ideally, would not cause the reset cell to snap back, in which case the target cell would be read as a logic zero. Sense circuitry, coupled to the memory cell, is configured to detect the presence or absence of snap back in a sensing time interval. The presence of snap back may then be interpreted as a logic one and the absence of snap back as a logic zero as noted above.

The differential bias at which a memory cell transitions from being sensed as a logic one (e.g., due to the memory cell snapping back) to being sensed as a logic zero (e.g., due to the memory cell not snapping back), may be termed a threshold voltage (sometimes referred to as a snap back voltage). Thus, when the VDM is higher than the threshold voltage of the memory cell as shown in FIG. 4, the memory cell may be sensed as storing a logic one and when the VDM is lower than the threshold voltage of the memory cell, the memory cell may be sensed as storing a logic zero.

In some embodiments, an applied bias such as the VDM of a read pulse may be high enough to only turn on 3D crosspoint cells in the crystalline state, which may have a lower threshold voltage than 3D crosspoint cells in the amorphous state. In some embodiments, the VDM may be supplied through negative and/or positive regulated nodes. For example, the BL electrode of the 3D crosspoint cell may be a positive regulated node and the WL electrode coupled to the cell may supply the bias for VDM and be a negative regulated node.

Referring still to FIG. 4 for ease of comprehension, as part of a write command to a cell that has a given state (i.e. set or reset), a memory controller circuitry (or memory controller) may, as an initial part of the write operation, control the performance of a pre-read operation on the cell by causing application across the cell of a voltage Read VDM and a peak voltage corresponding to the opposite state (i.e. reset or set) of the cell. The pre-read allows, among other things, a determination of a state of the cell prior to the write operation. The latter is because, if the state of a cell corresponds to the write command, for example, if the cell to be written to is a set cell and the write command is a set command, or if the cell to be written to is a reset cell and the write command is a reset command, then the memory controller does nothing more and does not cause a write to the cell as part of the write operation. However, if the state of a cell is opposite to that corresponding to the write command, it is then that the memory controller would continue causing the write operation past the pre-read operation.

Curve 402 represents an ideal voltage distribution for set cells, while curve 404 represents an ideal voltage distribution for reset cells. In practice however, some cells that are to be in a set state may have their bits at higher voltages than the ones shown for curve 402, those higher voltages represented in FIG. 4 by way of a tail curve 402t that may extend higher than Read VDM. Similarly, some cells that are to be in a reset state may have their bits at lower voltages than the ones shown for curve 404, those lower voltages represented in FIG. 4 by way of a tail curve 404t that may extend lower than Read VDM. Thus, pre-read operations are additionally implemented in order to capture the bits in the tail curves of the voltage distribution as shown in FIG. 4. Set operation uses VDM0 during a pre-read operation, which will not only set the reset bits if the cell is a reset cell (because VDM0 is below Read VDM), but, if the cell is a set cell, also capture the set bits drifted above VDM0 in distribution curve 402t and put them back into the set distribution. Reset operation uses VDM3 during pre-read, which will not only reset the set bits if the cell is a set cell (because VDM3 is above Read VDM), but also capture the reset bits drifted below VDM3 in distribution curve 404t, and put them back into the reset distribution. Thus, for a pre-read operation, the set command uses VDM0, and the reset command uses VDM3 which may be roughly 500 mV higher than VDM0.

Referring still to FIG. 4, graph 400 suggests a dual VDM feature by, in addition to marking a location of a read VDM on the y axis of the voltage distribution, further marking an example location of a low VDM (VDM0) and an example location of a high VDM (VDM3), VDM0 and VDM3 representing VDM voltage values in relation to the reset voltage distribution and the set voltage distribution, respectively. In particular, VDM0 corresponds to a pre-read VDM to be applied to a cell during a pre-read operation in response to a set command for the cell. VDM3 corresponds VDM to be applied to a cell during a pre-read operation in response to a reset command for the cell.

Figure 5:
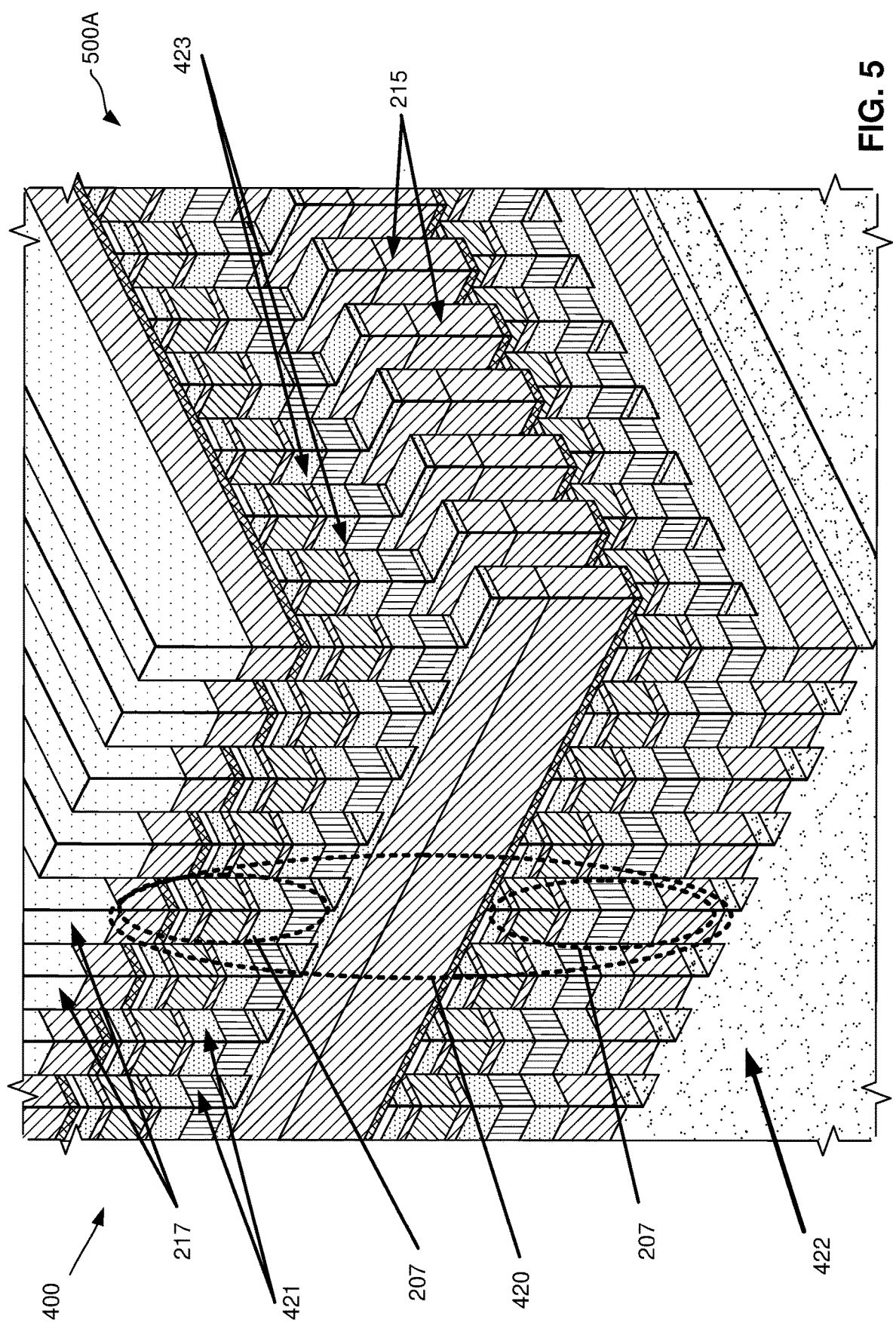
FIG. 5 is a schematic perspective three-dimensional view of a semiconductor structure for a 3D memory architecture according to some embodiments.

FIG. 5 is a schematic perspective three-dimensional view of a semiconductor structure for a 3D memory architecture according to some embodiments. In particular, FIG. 5 is a perspective diagram of an example of a portion of stack 500 of a 3D crosspoint memory device including memory arrays such as those of FIGS. 2 and 3. The specific layers are merely examples and will not be described in detail here. Stack 500 is built on substrate structure 522, such as silicon or another semiconductor. Stack 500 includes multiple pillars 520 as memory cell stacks of memory cells 207. In the diagram of stack 500, it will be observed that the WLs and BLs are orthogonal to each other, and traverse or cross each other in a cross-hatch pattern. A crosspoint memory structure includes at least one memory cell in a stack between layers of BL and WL. As illustrated, wordlines (WL) 215 are in between layers of elements, and bitlines (BL) 217 are located at the top of the circuit. Such a configuration is only an example, and the BL and WL structure can be swapped. Thus, in one representation of stack 500, the WLs can be the metal structures labeled as 217, and the BLs can be the metal structures labeled as 215. More generically, WLs and BLs can be referred to as "address lines", referring to signal lines used to address memory cells. Different architectures can use different numbers of stacks of devices, and different configuration of WLs and BLs. It will be understood that the spaces/trenches 521 running in one direction, and spaces/trenches 523 running in a direction perpendicular to trenches 521, the trenches 521 and 523 being defined between pillars 520, are to be typically filled with an insulator. In one example, stack 500 the BL and WL are made of tungsten metal.

At least some of WLs 215 may correspond to WLs 215 of FIG. 2. At least some of the BLs 217 may correspond to BLs 217 of FIG. 2. Substrate structure 522, such as a silicon substrate, may include control circuitry therein (not shown), such as control circuitry including transistors, row decoders, page buffers, etc. Memory cells 207 may correspond to memory cells 207 of FIG. 2, and may each include a selector device, and/or a memory element and a selector device. The control circuitry of substrate structure 522 may include, for example, a memory partition controller such as memory partition controller 210, BL control logic such as BL control logic 216, and WL control logic such as WL control logic 214 of FIG. 2. Each row of WLs 215 extending in the Y direction, the corresponding cells as coupled to corresponding BLs, would define a memory array, and may correspond to a memory array such as memory array 206 of FIGS. 2 and 3. Some of the WLs and some of the BLs may include dummy WLs or dummy BLs (not shown in FIG. 5), corresponding to the dummy WLs and dummy BLs in the dummy array 206B of FIGS. 2 and 3.

Figure 6A:
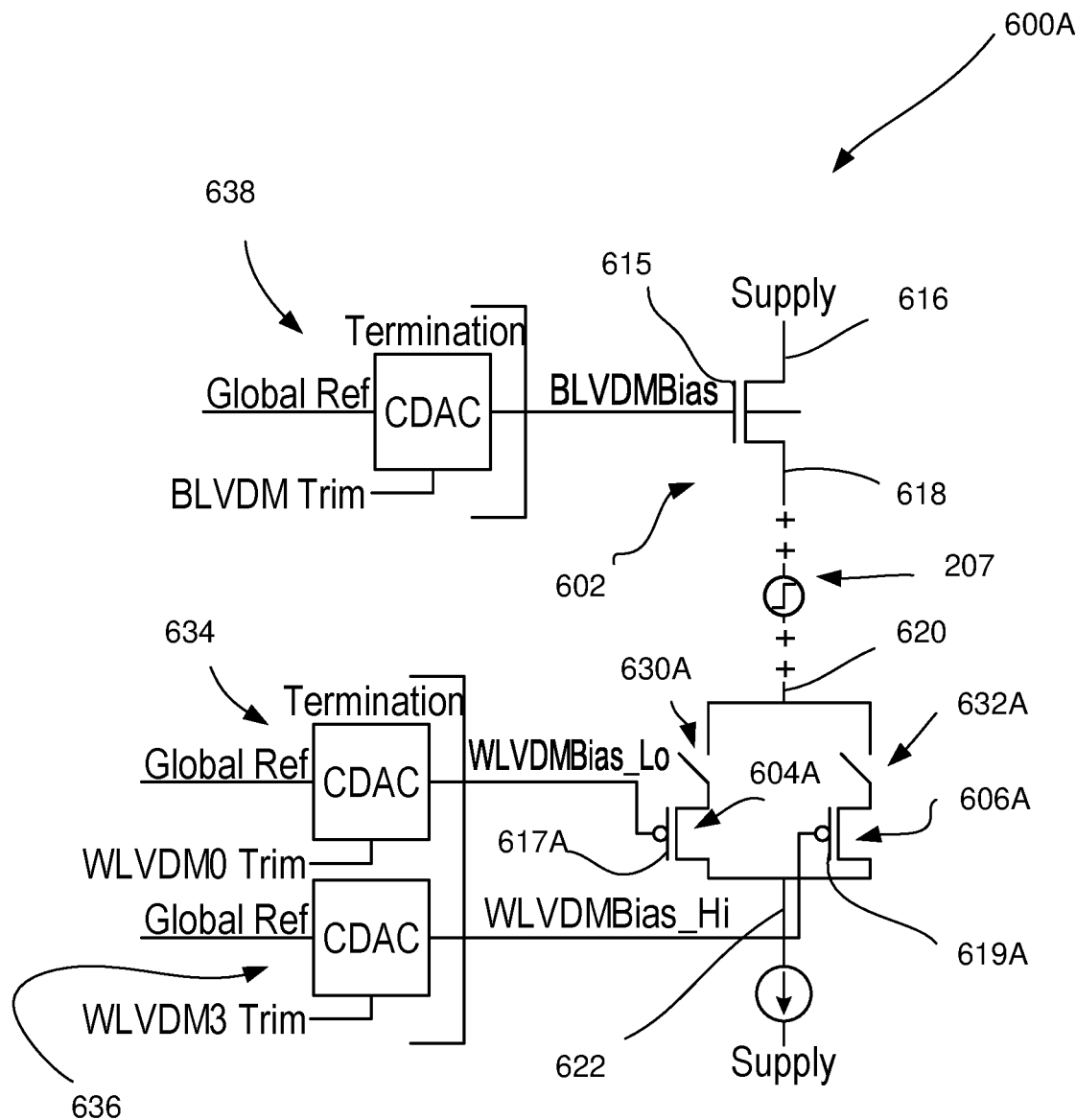
FIG. 6A is a schematic view of a memory device including a two source follower (SF) scheme in order to implement a pre-read operation as part of a write operation.

Reference is now made to FIG. 6A, which depicts memory circuitry 600 of a memory device, such as memory partition 122 of FIG. 1. The memory circuitry 600 may be used with dual VDM mechanisms of the state of the art, or it may be used to implement a dual VDM mechanism according to some embodiments, as will be explained in further detail below.

Referring still to FIG. 6A, memory circuitry 600A depicts circuit elements including circuit nodes coupled to a memory cell 207, corresponding for example to any memory cell 207 of memory array 206 as shown for example in FIGS. 2 and 3 described above. The example memory circuitry 600A includes BL metal oxide semiconductor field effect transistor (MOSFET) 602, shown in the figure as a n-type MOSFET or NMOS transistor, and two WL MOSFETs 604A and 606A shown in the figure as a p-type MOSFET or PMOS transistors. BL NMOS 602 includes a BL gate or Blvdm gate 615 and two BL NMOS terminals 616 and 618, while WL MOSFETS 604A and 606A include respective WL gates or Wlvdm gates 617A and 619A, and two shared WL PMOS terminals 620 and 622.

VDM may be applied across the memory cell 207 to read the cell 207, and may be defined in the context of FIG. 6A as the difference between the voltage blvdm at the BL NMOS terminal 618, and the voltage wlvdm at the WL PMOS terminal 620. Although a NMOS transistor 602 is shown for the BL side and a PMOS transistors 604A and 606A are shown for the WL side in FIG. 6A, embodiments are not so limited and include within their scope any circuitry to induce a VDM across the memory cell 207.

As noted previously, the two SF scheme of the prior art is implemented in part on a partition level, and in part on a tile level, and is shown in FIG. 6A as having been implemented on a WL side of the memory cells, although the prior art does sometimes apply it at the BL side of the memory cells instead. At a tile level, each SF of the two SF scheme of FIG. 6A has one enable switch 630A and 632A connected to respective terminals of transistors 604A and 606A, and a level shifter (not shown) to drive each switch. Switches 630A and 632A may be part of a WL switch circuitry, such as, for example, WL switch circuitry 220 of FIG. 2. At a partition level, each SF has its own voltage source, in the form of respective capacitive digital-to-analog converters (CDAC) 634A and 636A to respectively generate a low VDM voltage VDM0 in response to a set command, and a high VDM voltage VDM3 in response to a reset command, with the CDAC being shared by all the tiles inside the partition. The CDACs 634A and 636A are to respectively provide VDM0 and VDM3 to respective ones of the gates of MOSFETs 604A and 606A on the WL side of the memory cells of the partition that corresponds to the noted CDACs. CDACs 634A and 636A may be part of a WL control logic, such as, for example, WL control logic 214 of FIG. 2.

On the BL side of the memory cell shown, a CDAC 638, again at a partition level, provides a BL VDM to the gate of MOSFET 615. CDAC 638 may be part of a BL control logic, such as, for example, BL control logic 216 of FIG. 2.

In the prior art, when a memory controller, such as chip controller 126, storage device controller 118 of FIG. 1, memory partition controller 210, WL control logic 214 and/or BL control logic 216 (and thus one or more of components 126, 118, 210, 214 or 216), receives a set command for one or more cells of a given partition, it causes the switch 630A to be closed during a pre-read operation in order for VDM0 to be applied to the one or more cells of the given partition to be subjected to the set command. In the prior art, when a memory controller receives a reset command for one or more cells of a given partition, it causes the switch 632A to be closed during a pre-read operation in order for VDM3 to be applied to the one or more cells of the given partition to be subjected to the reset command. Activation of switches 630A and 632A can be performed in the circuitry of FIG. 6A at a tile level, meaning that, for a given command, whether set or reset, switches 630A or 632A may be activated at a tile level for the memory cells of the tile to be pre-read as a result of the given command. In the two SF scheme of the prior art, a memory controller may receive a set command for a first set of cells within a partition, and a reset command for a second set of cells within the same partition, where a pre-read of the set command and the reset command may overlap in time. In such a case, the memory controller may cause a closing of switch 604A for the first set of cells, and a closing of switch 606A for the second set of cells, a the same time, meaning that VDM0 and VDM3 may be active at the same time for pre-reads for different sets of cells within the same partition according to the two SF scheme of the prior art.

The SF with a gate bias, whether at the WL side or at the BL side of a cell, generated from CDAC is used to control the VDM voltage across the memory cell in the 3D memory architectures, such as in 3D Cross Point memory architectures. FIG. 6A shows an existing memory circuitry design to implement a dual VDM scheme. The VDM architecture as shown breaks the total VDM into the BL (bit-line) side and WL (word-line) side, where both sides have the separate controls: the BL side has one SF to generate the BLVDM voltage, which is common to all the tiles within the partition; and the WL side has two SFs with respective gate biases to generate WLVDM0 and WLVDM3 separately, where each SF on the WL side has its enable switch. The user data, in the form of a set command and/or a reset command, is to enable the appropriate SF to pass the VDM voltage to the cell during the pre-read algorithm. In the previous design, which may be implemented using the circuitry of FIG. 6A, the two SFs scheme enables all pre-read flavors to run in parallel (for a set of cells of a partition subject to a set command, and for a different set of cells of the partition subject to a reset command).

Figure 6B:
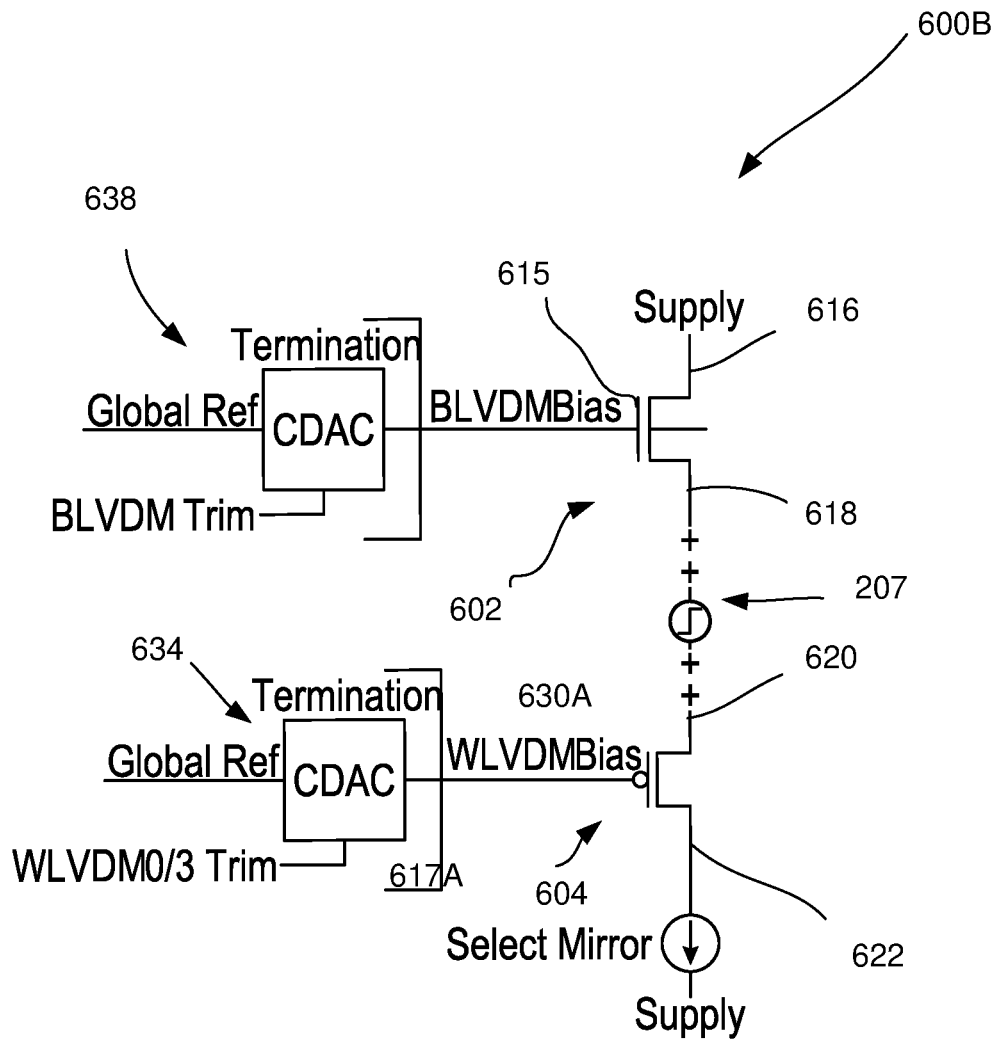
FIG. 6B is a schematic view of a memory device including a one source follower (SF) scheme in order to implement a pre-read operation as part of a write operation according to an embodiment.

FIG. 6B is similar to FIG. 6A, except that, in FIG. 6B, the dual VDM mechanism is implemented using a single SF scheme rather than a two SF scheme as may be applied in the case of FIG. 6A, as will be explained in more detail below. Like components as between FIG. 6B and FIG. 6A will be referred to with like reference numerals in those figures, and may not be described again in the context of FIG. 6B.

In FIG. 6B, memory circuitry 600B includes BL metal oxide semiconductor field effect transistor (MOSFET) 602, shown in the figure as a n-type MOSFET or NMOS transistor, and one WL MOSFET 604B shown in the figure as a p-type MOSFET or PMOS transistors. WL MOSFET 604B includes WL gates or Wlvdm gates 617, and two WL PMOS terminals 620 and 622.

The one SF scheme, an example of which is shown in FIG. 6B, may be implemented in part on a partition level, and in part on a tile level, and is shown in FIG. 6B as having been implemented on a WL side of the memory cells, although the prior art does sometimes apply it at the BL side of the memory cells instead. At a tile level, an SF of the one SF scheme of FIG. 6B has a single WL transistor 604 for the application of a bias by the single voltage source in the form of single CDAC 634, and no level shifter. The CDAC 634 may be controlled by a memory controller to generate both a low VDM voltage VDM0 in response to a set command, and a high VDM voltage VDM3 in response to a reset command, but at different times (hence the time multiplexing aspect of voltage source activation according to embodiments). CDAC 634 may be part of a WL control logic, such as, for example, WL control logic 214 of FIG. 2.

Although a NMOS transistor 602 is shown for the BL side and a PMOS transistor 604B is shown for the WL side in FIG. 6B, embodiments are not so limited and include within their scope any circuitry to induce a VDM across the memory cell 207.

According to some embodiments, a one SF scheme may be implemented as opposed to a two SF scheme of the prior art. A one SF scheme, may, according to an embodiment, be implemented in part on a partition level, and in part on a tile level, and is shown in FIG. 6B as having been implemented on a WL side of the memory cells, although embodiments also include implementing a single SF scheme one a BL side of the memory cells instead. At a tile level, the SF of the one SF scheme of FIG. 6B advantageously does not have any enable switch or level shifter to drive a switch, as neither of those components would be needed. At a partition level, the SF has one capacitive digital-to-analog converter (CDAC) 635 to generate a low VDM voltage VDM0 in response to a set command, and a high VDM voltage VDM3 in response to a reset command, with the CDAC operating at the partition level such that VDM0 and VDM3 are time-multiplexed with respect to one another. In the one SF scheme of embodiments, a memory controller may receive a set command for a first set of cells within a partition, and a reset command for a second set of cells within the same partition, where a pre-read of the set command would, in a two SF scheme, have overlapped in time with a pre-read of the reset command. In such a case, the memory controller may cause the CDAC 635 to apply VDM0 for a first time period corresponding to a pre-read operation of the first set of cells, and to apply VDM3 for a second time period corresponding to a pre-read operation of the second set of cells, where the second time period is after the first time period. Thus, according to embodiments, application of VDM0 and VDM3 to sets of cells may be time multiplexed, meaning that application of VDM0 and VDM3 happen at different times for respective different sets of cells within the same partition.

On the BL side of the memory cell shown, a CDAC 638, again at a partition level, provides a BL VDM to the gate of MOSFET 615.

The CDACs and transistors shown in FIGS. 6A and 6B may be part of one of the WL control logic 214 or the BL control logic 216 of FIG. 2, as appropriate.

According to embodiments, when a memory controller, such as chip controller 126, storage device controller 118 of FIG. 1, memory partition controller 210, WL control logic 214 and/or BL control logic 216 (and thus one or more of components 126, 118, 210, 214 or 216), receives a set command for one or more cells of a given partition, it causes a CDAC coupled to the one or more cells to apply a low voltage VDM0 across the one or more cells during a pre-read operation. According to embodiments, when a memory controller receives a reset command for one or more cells of the given partition, it causes the CDAC coupled to the one or more cells to apply a high voltage VDM3 across the one or more cells during a pre-read operation. Implementation of VDM0 and VDM3 may be performed in the circuitry of FIG. 6B at a tile level, meaning that, for a given command, whether set or reset, VDM0 or VDM3 may be activated in a time multiplexed manner at a tile level for the memory cells of the tile to be pre-read as a result of the given command.

Some embodiments propose a single SF scheme, such as a single WL VDM SF scheme (WLVDM SF) as shown by way of example in FIG. 6B, for example at the tile level, the single SF scheme to implement time multiplexing in the application, during a pre-read operation associated with a write command, of a low pre-read voltage VDM0 for a set command, and a high pre-read voltage VDM3 for a reset command. A memory controller may use time multiplexing of pre-read voltage levels by controlling a CDAC architecture of a memory partition to cause application of the two different VDMs for both pre-read flavors at different times.

Some embodiments advantageously do away with a two SF architecture of the prior art, and propose therefore removing a CDAC, enable switch and level shifter for one of two SF architectures, as seen in the difference between FIGS. 6A and 6B described above. Using a single SF architecture instead of a two SF architecture advantageously allows fitting control circuitry under memory arrays as memory architectures shrink. Some embodiments also remove the corresponding CDAC in partition termination area and contributes to the die-size saving goal.

Some 3D memory architectures contemplate reducing existing tile areas by about 60% as the technology progresses and memory devices scale. Thus, tile control circuits would need to fit under the thus reduced in size memory arrays. Removing one of the two SFs and its corresponding enable switch and level shifter can help to achieve the tile area reduction goal noted above. The corresponding CDAC in the partition termination will be removed as well, which will contribute to the die-size reduction goal.

A one SF scheme according to embodiments provides only one VDM voltage at a time during a pre-read operation, and thus, the memory controller circuitry is not able to perform both set pre-read and reset pre-read in parallel for a given partition, hence the time multiplexing described above. Preferably, since set-on-reset (that is, a set command to be performed on a reset cell) may represent a time critical path in a write algorithm, the pre-read of the set command may start before the pre-read of the reset command in a time multiplexing scheme of some embodiments, as explained above, in to optimize the algorithm time. The pre-read of the reset command may then start after the pre-read of set finishes as shown on the timing diagram in FIG. 7, which will now be described in more detail below. It is to be noted that, although performing the set pre-read before a reset pre-read is described herein, embodiments encompass within the scope a time multiplexing scheme that involves finishing a reset command pre-read prior to starting a set command pre-read.

Figure 7:
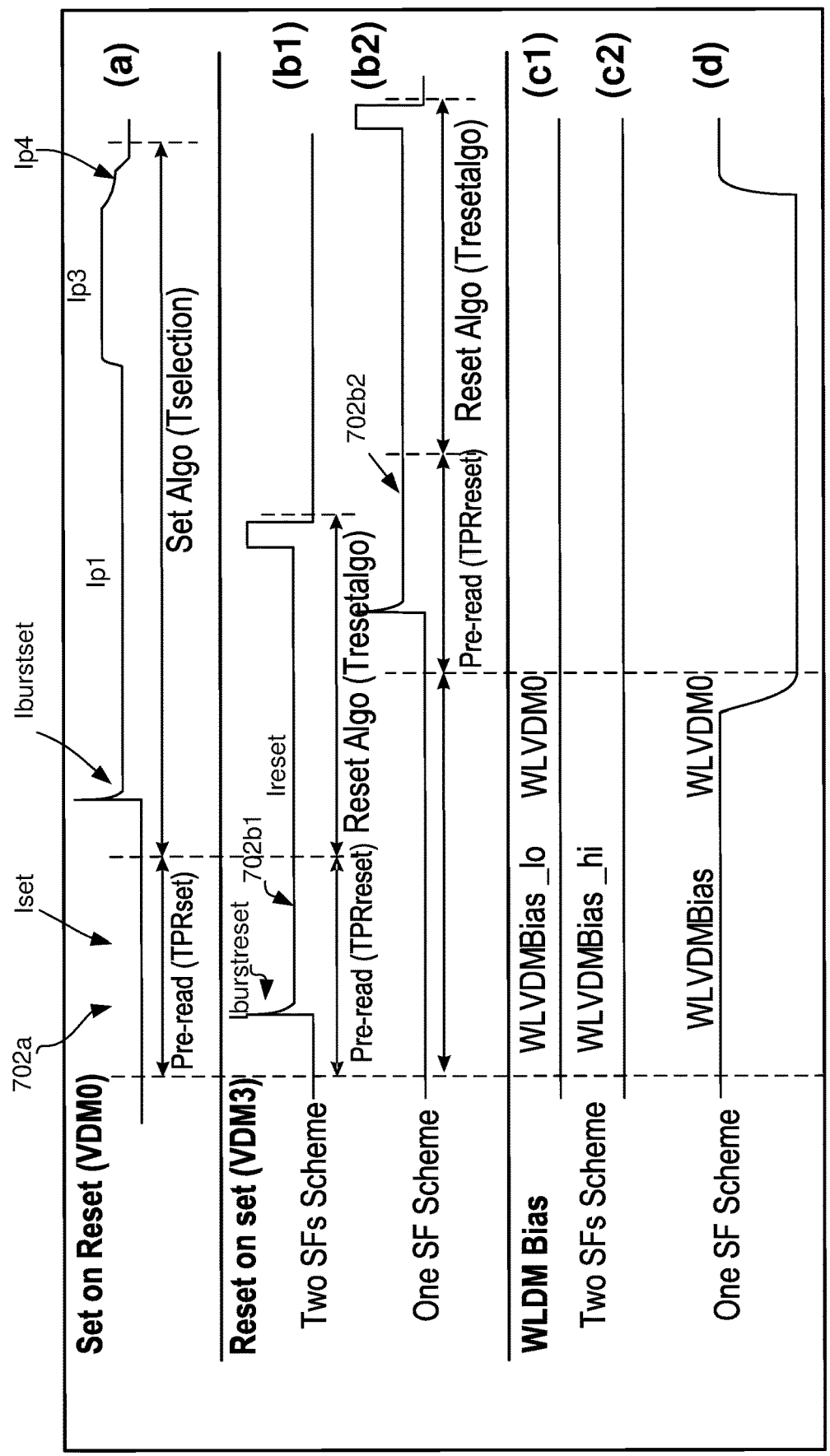
FIG. 7 shows a dual VDM diagram juxtaposing current versus time and WLVDM versus time for both a one SF scheme as could be applied using the architecture of FIG. 6A, and a one SF scheme as could be applied using the architecture of FIG. 6B.

Referring now to FIG. 7, a dual VDM diagram 700 is shown juxtaposing current versus time and WLVDM versus time for both a two SF scheme as could be applied using the architecture of FIG. 6A, and a one SF scheme as could be applied using the architecture of FIG. 6B. Graph 700(a), plots a curve configuration of current through a memory cell $I_{cell}$ against time for a set command to be implemented on a reset cell subjected to VDM0, and applies to both a two SF scheme and a one SF scheme. Graph 700(b1), plots a curve configuration of current through a memory cell $I_{cell}$ against time for a reset command to be implemented on a set cell subjected to VDM3, for a two SF scheme. Graph 700(b2), plots a curve configuration of current through a memory cell $I_{cell}$ against time for a reset command to be implemented on a set cell subjected to VDM3, for a one SF scheme according to an embodiment. Graph 700(c1), plots, against time, a curve configuration of WLVDM held at VDM0 and applied to the gate of a VDM0 WL side MOSFET (for example, gate 617a of MOSFET 604A of FIG. 6A), in a two SF scheme. Graph 700(c2), plots, against time, a curve configuration of WLVDM held at VDM3 and applied to the gate of a VDM3 WL side MOSFET (for example, gate 619A of MOSFET 606A of FIG. 6A), in a two SF scheme. Graph 700(d), plots, against time, a curve configuration of WLVDM applied to the gate of the single WL side MOSFET (for example, gate 617 of MOSFET 604 of FIG. 6B), in a one SF scheme according to an embodiment.

Referring to graph 700(a) of FIG. 7, when a memory controller receives a write command in the form of a set command for a first group of memory cells (or first memory cells), for both a two SF scheme and a single SF scheme, it may begin with a set pre-read operation 702a on each memory cell of the first group (hereinafter "first group memory cell"), with a current $I_{leakageset}$ that lasts a time period $T_{PRset}$, followed by a short current burst $I_{burstset}$ where the BL may be set at a voltage to effectively short circuit the first group memory cell to turn it on, followed by a lower time period $T_{sp1}$ where a current $I_{p1}$ is delivered through the first group memory cell, a higher selection current time period $T_{Sp3}$ where a current $I_{p3}$ is delivered through the first group memory cell, and a gradually decreasing selection current time period $T_{Sp4}$ where a gradually decreasing set of currents $I_{p4}$ are delivered through the first group memory cell. The above current profile that occurs after $T_{PRset}$ may apply in a set command to be executed on one or more reset cells of the first group, whether in a two SF regime or in a one SF regime. A period $T_{selection}$ including $T_{sp1}$ to $T_{Sp4}$ is to attempt to help establish the voltage distribution profile 402 and 404 shown in FIG. 4 and described above and to establish an optimal voltage window without tail curves between the highest set voltage and the lowest reset voltage. The current curve of graph 700(a) after $T_{PRset}$ corresponding to $I_{leakageset}$ pertains to a set command applied where the pre-read operation results in a determination that a memory cell subject to the pre-read operation at $T_{PRset}$ is a reset cell. If the pre-read operation had determined a set cell, the memory controller would refrain any more operations corresponding to the set command after $T_{PRset}$ for that memory cell determined to be a set cell (set command would complete).

Referring to graph 700(b1) of FIG. 7, a memory controller may receive a write command in the form of a reset command for a second group of memory cells during a time period when a pre-read operation associated with the reset command (reset pre-read operation) would, in a two SF scheme, at least partially overlap with the pre-read operation associated with the set command (set pre-read operation) described in relation to graph 700(a) above. In the event of the reset command for the second group of memory cells, for a two SF scheme, the reset pre-read operation may begin, for each memory cell of the second group (hereinafter "the second group memory cell") with a short current burst $I_{burstreset}$ where the BL may be set at a voltage to effectively short circuit the second group memory cell to turn it on, followed by a reset current $I_{reset}$ that lasts a time period $T_{PRreset}$ during a reset pre-read operation 702b1. $I_{reset}$ is maintained after conclusion of $T_{PRreset}$, for a period $T_{ResetAlgo}$ until conclusion of the application of a square current pulse Tend to end the reset command algorithm. The period $T_{ResetAlgo}$ is to help establish the voltage distribution profile 402 and 404 shown in FIG. 4 and described above and to establish an optimal voltage window without tail curves between the highest set voltage and the lowest reset voltage. The current curve of graph 700(b1) after $T_{PRreset}$ pertains to a reset command applied where the pre-read operation results in a determination that a memory cell subject to the pre-read operation at $T_{PRreset}$ is a set cell. If the reset pre-read operation had determined a reset cell, the memory controller would refrain any more operations corresponding to the set command after $T_{PRreset}$ for that memory cell determined to be a reset cell (reset command would complete).

Referring to both graphs 700(a) and 700(b1) together, one can see that, for a two SF scheme of the prior art, the set on reset pre-read operation 702a during $T_{PRset}$ can overlap with the set pre-read operation 702b1 during $T_{PRreset}$. Thus, when a set command is received at the memory controller for a first group including first memory cells, such as at memory controller 126 or storage device controller 118 of FIG. 1, and a reset command is received at the memory controller for a second group including second memory cells, the pre-read periods for each of the set command and the reset command may overlap at least in part in the time domain.

Referring to graphs 700(c1) and 700(c2), these graphs plot, against time, WLVDM biases for VDM0 and VDM3 as supplied by respective CDACs, such as by CDACs 634 and 636 to gates of 617A and 619A of WL MOSFETS 604A and 606A, for a two SF regime. While the supply of VDM0 and VDM3 from respective CDACs to respective WL transistor gates may be constant through time, as depicted in graphs 700(c1) and 700(c2) by way of example, an appropriate one of two corresponding switches per memory cell, such as switches 630A and 632A, may be closed to in fact apply VDM0 (for a set command to be applied to a memory cell) or VDM3 (for a reset command to be applied to a memory cell) as appropriate. As suggested by graphs 700(a) and 700(b1) viewed together, an overlap between the set pre-read $T_{PRset}$ and the reset pre-read $T_{PRreset}$ suggests an overlap in the application of VDM0 and VDM3 (overlap as in overlap in a time domain), which can occur where the set command is to apply to a first group of memory cells and the reset command is to apply to a second, different group of memory cells. In that case, the memory controller may: (1) cause VDM0, as supplied constantly by CDAC 634, to be applied to the first group by closing switches 630A of the first group; and (2) cause VDM3, as supplied constantly by CDAC 636, to be applied to the second group by closing switches 632A of the second group. The one or more cells of the first group would then exhibit the current profile of graph 700(a), while the one or more cells of the second group would exhibit the current profile of graph 700(b1), where VDM0 and VDM3 would be used concurrently on different cells to effect a set pre-read and a reset pre-read operation.

Referring to graph 700(b2) of FIG. 7, a memory controller may receive a write command in the form of a reset command for a second group of memory cells during a time period when a pre-read operation associated with the reset command (reset pre-read operation) would have, in a one SF scheme, at least partially overlapped with the pre-read operation associated with the set command (set pre-read operation) described in relation to graph 700(a) above. In the event of the reset command for the second group of memory cells, for a one SF scheme, the reset pre-read operation 702(b2) may not begin until after a delay period $T_{snap}$ determined from the end of the set pre-read operation. $T_{snap}$ corresponds to a time on or after a determination that reset cells of the memory cells of the first group have snapped to a set state. After $T_{snap}$, the reset pre-read operation may begin, and may correspond to a current profile through each memory cell of the second group (hereinafter "the second group memory cell") that is similar to the reset pre-read operation current profile already explained above in relation to graph 700(b1) above. As a result, the varying stages of the reset current profile for the one SF scheme will not be repeated in the context of graph 700(b2).

Similar to graph 700(b1), the current profile of graph 700(b2) after $T_{PRreset}$ pertains to a reset command applied where the reset pre-read operation results in a determination that a memory cell subject to the pre-read operation at $T_{PRreset}$ is a set cell. If the reset pre-read operation had determined a reset cell, the memory controller would refrain from any more operations corresponding to the set command after $T_{PRreset}$ for that memory cell determined to be a reset cell. The difference between graph 700(b 1) (two SF scheme) and graph 700(b2) (one SF scheme) is in that, as suggested by graph 700(b2), in a one SF scheme, a start of the entire reset algorithm (including the reset pre-read operation), including a start of the reset pre-read, is offset with respect to a start of the set algorithm by a delay large enough to result in the set pre-read operation and the reset pre-read operation not overlapping (that is, not having any overlap in a time domain).

Referring to both graphs 700(a) and 700(b2) together, for a one SF scheme, as shown by way of example in graphs 700(a) in conjunction with 700(b2), the set pre-read operation during $T_{PRset}$ does not overlap with the reset pre-read operation during $T_{PRreset}$. Thus, when a set command is received at the memory controller for the first group including memory cells, such as memory controller 126 or storage device controller 118 of FIG. 1, and a reset command is received at the memory controller for a second group including memory cells, the pre-read periods for each of the set command and the reset command would in any event happen at different times. In the shown embodiment, the reset pre-read operation starts after a delay from the beginning of the set pre-read operation when the set command and the reset command are to be executed in a manner that would have required their pre-read periods to otherwise overlap.

Referring to graphs 700(*d*), this graph plots, against time, the WLVDM bias going from VDM0 and VDM3 as supplied by a single voltage source, such as a single CDAC 634 to a gate 617 of a single WL MOSFET 604 for a one SF scheme. The supply of VDM0 or VDM3 from the single CDAC to the gate of the single WL MOSFET per memory cell, is dependent on time. That is, the single voltage source, for example CDAC according to some embodiments, is a voltage source that is configured such that, if it is to supply different voltages, it does so only as a function of time, and not in a manner where two different voltage values are supplied in a same time instance. A single SF scheme does not require a pair of enable switches and level shifter to enable duel VDM. Embodiments do not include an overlap between the set pre-read $T_{PRset}$ and the reset pre-read $T_{PRreset}$ for set and reset command to be applied to given sets of memory cells. Instead, embodiments suggest time multiplexing application of VDM0 and VDM3 across respective sets of memory cells (respectively from a first group subject to the set command and a second group subject to the reset command) such that the reset algorithm begins after the end of the set pre-read operation. Thus, in a single SF scheme, the memory controller may: (1) cause VDM0 to be supplied by CDAC 634 across the memory cells of the first group; and (2) after a time delay, cause VDM3 to be supplied by CDAC 634 and to be applied to the memory cells of the second group. The time delay may correspond to a time period between a start of the execution of the set command and a time of snap detection for a snapping into set cells of the reset cells within the first group. The one or more cells of the first group would then exhibit the current profile of graph 700(*a*), while the one or more cells of the second group would exhibit the current profile of graph 700(*b*2), where VDM0 and VDM3 would be used at different times on different cells to effect a set pre-read and a reset pre-read.

As suggested by FIG. 7, embodiments use a time multiplexing concept to generate WLVDM0 and WLVDM3 at different times using a one SF scheme, so that a set pre-read and a reset pre-read will get the correct VDM voltage.

As suggested in graph 700(*a*), the set pre-read starts at the beginning of execution of the set command algorithm for the memory cells in the first group (the group to which the set command is directed). Here, the WLVDM CDAC, for example at the partition level, generates WLVDM0 to be applied to the memory cells of the first group. At this phase, according to a one SF scheme, the memory cells of a second group (e.g. all the tiles of the partition) that are to receive the reset command are inactive, because the voltage source CDAC. After the set pre-read concludes (which may be at a time of a determination of the state—whether set or reset, of the memory cells of the first group), the set algorithm proceeds, for those remaining cells determined through the set pre-read not to be in a set state, to perform a set-on-reset selection and snap detection operation on those remaining cells. For those memory cells of the first group determined by way of the pre-read operation to have been in a set state, the memory controller may cause the performance of either an ESSR operation, or directly complete (shut down the cell) depending on the cell electrical distance (ED). Some of the memory cells may be relatively close to the WL drivers and/or the BL drivers, while others may be relatively far from the WL drivers and/or the BL driver. The transmission lines between the drivers and the memory cells may thus differ in length. Such differences may cause differing parasitic capacitances in the transmission lines and/or differing resistances in the transmission lines. These different lengths and their associated electrical parameters are referred to herein as an electrical distance (ED).

If the cell ED corresponds to a far cell, that is, if the cell has a distance larger than a predetermined threshold from the memory controller or the associated WL and BL control logic, the memory controller may stop current flow through the far cell. If the cell ED corresponds to a near cell, that is, if the cell has a distance smaller than or equal to the predetermined threshold from the memory controller or the associated WL and BL control logic, the memory controller may cause performance of the ESSR by causing a higher current than the pre-read current to flow through the near cell for a predetermined time duration in order to bring the threshold voltage Vt of the near cell back to its value prior to the pre-read operation. The reset pre-read is still inactivated for the memory cells of the second group at this phase since the BLVDM is used for set selection and snap detection or ESSR where applicable, and is in any event not available to generate the reset pre-read BLVDM.

After snap detection finishes, which may be determined, for example, by a clock cycle of the memory controller, the reset pre-read operation may start on the memory cells of the second group, with the WLVDM CDAC adjusted to WLVDM3 as seen in FIG. 7(*d*). The adjustment in the bias supplied across the memory cell from VDM0 to VDM3 may happen after the set pre-read operation, and preferably at a time corresponding to or after snap detection concerning a snapping into a set state of reset cells of the first group (i.e. the group subject to the set command). At the same time as the changing of WLVDMBias provided by the CDAC from VDM0 to VDM3 (noting that VDM3 is larger in absolute value than VDM0 but, because of the negative sign of WLVDMBias in the shown example, shows as a decrease in the voltage profile of graph 7(*d*)), the memory controller may be causing application of a p1 current $I_{p1}$ on the memory cells that were at a reset state at the time of determination of the set command. With the profile of the WLVDM bias being what is shown by way of example in FIG. 7(*d*), changes in current profiles as shown in graphs 700(*a*)-700(*b*2) may be brought about in conjunction with change in the bias applied by way of the BL for each corresponding memory cell.

Referring still to FIG. 7, after the reset pre-read finishes (which may be at a time of a determination of the state—whether set or reset, of the memory cells of the second group), the reset algorithm proceeds, for those remaining cells determined through the reset pre-read not to be in a reset state, to perform the rest of the reset operation on those remaining cells. For those memory cells of the first group determined by way of the pre-read operation to have been in a reset state, the memory controller may directly complete (shut down the cell). In parallel, the memory controller would be executing the set algorithm to deliver currents $I_{p1}$, $I_{p3}$ and $I_{p4}$ as noted above, until the end of the set algorithm. According to one embodiment, the reset current pulse during reset pre-read should not overlap with the $I_{p3}$ pulse. Otherwise the two pulses may both couple to the mirror bias of the current generation circuitry and introduce extra current variation.

Figure 8:
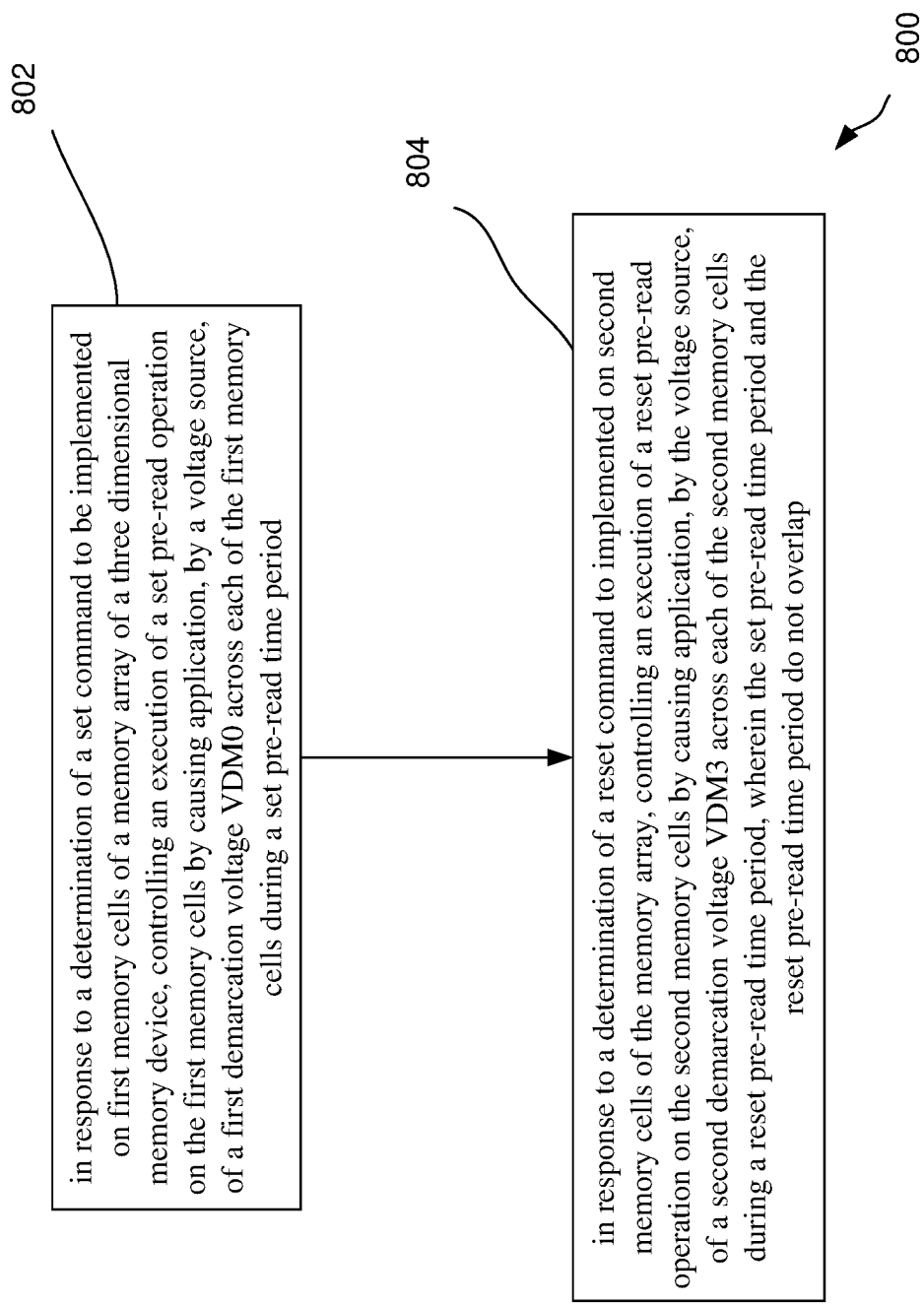
FIG. 8 illustrates an example process in accordance with certain embodiments.

FIG. 8 illustrates an example of a process 800 according to some embodiments. The process includes, at operation 802, the process includes in response to a determination of a set command to be implemented on first memory cells of a memory array of a three dimensional memory device, controlling an execution of a set pre-read operation on the first memory cells by causing application, by a voltage source, of a first demarcation voltage VDM0 across each of the first memory cells during a set pre-read time period; at operation 804, the process includes in response to a determination of a reset command to be implemented on second memory cells of the memory array, controlling an execution of a reset pre-read operation on the second memory cells by causing application, by the voltage source, of a second demarcation voltage VDM3 across each of the second memory cells during a reset pre-read time period, wherein the set pre-read time period and the reset pre-read time period do not overlap, the voltage source to supply a single voltage value at any given time.

The flow described in FIG. 8 is merely representative of operations that may occur in particular embodiments. In other embodiments, additional operations may be performed by the components of system 100. Various embodiments of the present disclosure contemplate any suitable signaling mechanisms for accomplishing the functions described herein. Some of the operations illustrated in FIG. 8 may be repeated, combined, modified, or deleted where appropriate. Additionally, operations may be performed in any suitable order without departing from the scope of particular embodiments.

A design may go through various stages, from creation to simulation to fabrication. Data representing a design may represent the design in a number of manners. First, as is useful in simulations, the hardware may be represented using a hardware description language (HDL) or another functional description language. Additionally, a circuit level model with logic and/or transistor gates may be produced at some stages of the design process. Furthermore, most designs, at some stage, reach a level of data representing the physical placement of various devices in the hardware model. In the case where conventional semiconductor fabrication techniques are used, the data representing the hardware model may be the data specifying the presence or absence of various features on different mask layers for masks used to produce the integrated circuit. In some implementations, such data may be stored in a database file format such as Graphic Data System II (GDS II), Open Artwork System Interchange Standard (OASIS), or similar format.

In some implementations, software based hardware models, and HDL and other functional description language objects can include register transfer language (RTL) files, among other examples. Such objects can be machine-parsable such that a design tool can accept the HDL object (or model), parse the HDL object for attributes of the described hardware, and determine a physical circuit and/or on-chip layout from the object. The output of the design tool can be used to manufacture the physical device. For instance, a design tool can determine configurations of various hardware and/or firmware elements from the HDL object, such as bus widths, registers (including sizes and types), memory blocks, physical link paths, fabric topologies, among other attributes that would be implemented in order to realize the system modeled in the HDL object. Design tools can include tools for determining the topology and fabric configurations of system on chip (SoC) and other hardware device. In some instances, the HDL object can be used as the basis for developing models and design files that can be used by manufacturing equipment to manufacture the described hardware. Indeed, an HDL object itself can be provided as an input to manufacturing system software to cause the described hardware.

In any representation of the design, the data may be stored in any form of a machine readable medium. A memory or a magnetic or optical storage such as a disc may be the machine readable medium to store information transmitted via optical or electrical wave modulated or otherwise generated to transmit such information. When an electrical carrier wave indicating or carrying the code or design is transmitted, to the extent that copying, buffering, or re-transmission of the electrical signal is performed, a new copy is made. Thus, a communication provider or a network provider may store on a tangible, machine-readable storage medium, at least temporarily, an article, such as information encoded into a carrier wave, embodying techniques of embodiments of the present disclosure.

A module as used herein refers to any combination of hardware, software, and/or firmware. As an example, a module includes hardware, such as a micro-controller, associated with a non-transitory medium to store code adapted to be executed by the micro-controller. Therefore, reference to a module, in one embodiment, refers to the hardware, which is specifically configured to recognize and/or execute the code to be held on a non-transitory medium. Furthermore, in another embodiment, use of a module refers to the non-transitory medium including the code, which is specifically adapted to be executed by the microcontroller to perform predetermined operations. And as can be inferred, in yet another embodiment, the term module (in this example) may refer to the combination of the microcontroller and the non-transitory medium. Often module boundaries that are illustrated as separate commonly vary and potentially overlap. For example, a first and a second module may share hardware, software, firmware, or a combination thereof, while potentially retaining some independent hardware, software, or firmware. In one embodiment, use of the term logic includes hardware, such as transistors, registers, or other hardware, such as programmable logic devices.

Logic may be used to implement any of the functionality of the various components such as CPU 102, external I/O controller 104, processor 108, cores 114A and 114B, I/O controller 110, CPU memory controller 112, storage device 106, system memory device 107, memory chip 116, storage device controller 118, address translation engine 120, memory partition 122, program control logic 124, chip controller 126, memory array 306, memory partition controller 310, word line control logic 314, bit line control logic 316, or other entity or component described herein, or subcomponents of any of these.

"Logic" may refer to hardware, firmware, software and/or combinations of each to perform one or more functions. In various embodiments, logic may include a microprocessor or other processing element operable to execute software instructions, discrete logic such as an application specific integrated circuit (ASIC), a programmed logic device such as a field programmable gate array (FPGA), a storage device containing instructions, combinations of logic devices (e.g., as would be found on a printed circuit board), or other suitable hardware and/or software. Logic may include one or more gates or other circuit components. In some embodiments, logic may also be fully embodied as software. Software may be embodied as a software package, code, instructions, instruction sets and/or data recorded on non-transitory computer readable storage medium. Firmware may be embodied as code, instructions or instruction sets and/or data that are hard-coded (e.g., nonvolatile) in storage devices.

Use of the phrase 'to' or 'configured to,' in one embodiment, refers to arranging, putting together, manufacturing, offering to sell, importing, and/or designing an apparatus, hardware, logic, or element to perform a designated or determined task. In this example, an apparatus or element thereof that is not operating is still 'configured to' perform a designated task if it is designed, coupled, and/or interconnected to perform said designated task. As a purely illustrative example, a logic gate may provide a 0 or a 1 during operation. But a logic gate 'configured to' provide an enable signal to a clock does not include every potential logic gate that may provide a 1 or 0. Instead, the logic gate is one coupled in some manner that during operation the 1 or 0 output is to enable the clock. Note once again that use of the term 'configured to' does not require operation, but instead focus on the latent state of an apparatus, hardware, and/or element, where in the latent state the apparatus, hardware, and/or element is designed to perform a particular task when the apparatus, hardware, and/or element is operating.

Furthermore, use of the phrases 'capable of/to,' and or 'operable to,' in one embodiment, refers to some apparatus, logic, hardware, and/or element designed in such a way to enable use of the apparatus, logic, hardware, and/or element in a specified manner. Note as above that use of to, capable to, or operable to, in one embodiment, refers to the latent state of an apparatus, logic, hardware, and/or element, where the apparatus, logic, hardware, and/or element is not operating but is designed in such a manner to enable use of an apparatus in a specified manner.

A value, as used herein, includes any known representation of a number, a state, a logical state, or a binary logical state. Often, the use of logic levels, logic values, or logical values is also referred to as 1's and 0's, which simply represents binary logic states. For example, a 1 refers to a high logic level and 0 refers to a low logic level. In one embodiment, a storage cell, such as a transistor or flash cell, may be capable of holding a single logical value or multiple logical values. However, other representations of values in computer systems have been used. For example, the decimal number ten may also be represented as a binary value of 1010 and a hexadecimal letter A. Therefore, a value includes any representation of information capable of being held in a computer system.

Moreover, states may be represented by values or portions of values. As an example, a first value, such as a logical one, may represent a default or initial state, while a second value, such as a logical zero, may represent a non-default state. In addition, the terms reset and set, in one embodiment, refer to a default and an updated value or state, respectively. For example, a default value potentially includes a high logical value, i.e. reset, while an updated value potentially includes a low logical value, i.e. set. Note that any combination of values may be utilized to represent any number of states.

The embodiments of methods, hardware, software, firmware, or code set forth above may be implemented via instructions or code stored on a machine-accessible, machine readable, computer accessible, or computer readable medium which are executable by a processing element. A non-transitory machine-accessible/readable medium includes any mechanism that provides (i.e., stores and/or transmits) information in a form readable by a machine, such as a computer or electronic system. For example, a non-transitory machine-accessible medium includes random-access memory (RAM), such as static RAM (SRAM) or dynamic RAM (DRAM); ROM; magnetic or optical storage medium; flash storage devices; electrical storage devices; optical storage devices; acoustical storage devices; other form of storage devices for holding information received from transitory (propagated) signals (e.g., carrier waves, infrared signals, digital signals); etc., which are to be distinguished from the non-transitory mediums that may receive information there from.

Instructions used to program logic to perform embodiments of the disclosure may be stored within a memory in the system, such as DRAM, cache, flash memory, or other storage. Furthermore, the instructions can be distributed via a network or by way of other computer readable media. Thus a machine-readable medium may include any mechanism for storing or transmitting information in a form readable by a machine (e.g., a computer), but is not limited to, floppy diskettes, optical disks, Compact Disc, Read-Only Memory (CD-ROMs), and magneto-optical disks, Read-Only Memory (ROMs), Random Access Memory (RAM), Erasable Programmable Read-Only Memory (EPROM), Electrically Erasable Programmable Read-Only Memory (EEPROM), magnetic or optical cards, flash memory, or a tangible, machine-readable storage medium used in the transmission of information over the Internet via electrical, optical, acoustical or other forms of propagated signals (e.g., carrier waves, infrared signals, digital signals, etc.). Accordingly, the computer-readable medium includes any type of tangible machine-readable storage medium suitable for storing or transmitting electronic instructions or information in a form readable by a machine (e.g., a computer).

EXAMPLES

Some examples of embodiments are provided below.

Example 1 includes an apparatus to be coupled to a memory array of a memory device, the apparatus including one or more processors to: in response to a determination of a set command to be implemented on first memory cells of the memory array, control an execution of a set pre-read operation on the first memory cells by causing application, by a voltage source, of a first demarcation voltage VDM0 across each of the first memory cells during a set pre-read time period; and in response to a determination of a reset command to implemented on second memory cells of the memory array, control an execution of a reset pre-read operation on the second memory cells by causing application, by the voltage source, of a second demarcation voltage VDM3 across each of the second memory cells during a reset pre-read time period, wherein the set pre-read time period and the reset pre-read time period do not overlap, the voltage source to supply a single voltage value at any given time.

Example 2 includes the subject matter of Example 1, wherein the one or more processors are to refrain from causing current to flow through the second memory cells at least during the set pre-read time period.

Example 3 includes the subject matter of Example 1, further including the voltage source, the voltage source coupled to one of wordlines or bitlines of both the first memory cells and the second memory cells.

Example 4 includes the subject matter of Example 3, wherein the voltage source is coupled to wordlines of the first memory cells and the second memory cells, and wherein, for each of the first memory cells and each of the second memory cells, the voltage source is to supply a bias to a single transistor of a corresponding one of the wordlines in order to apply VDM0 across said each of the first memory cells and VDM3 across said each of the second memory cells.

Example 5 includes the subject matter of Example 1, wherein the first memory cells and the second memory cells are part of a same partition of the memory device, and wherein the voltage source is to supply bias to all memory cells of the partition.

Example 6 includes the subject matter of Example 1, wherein the reset pre-read time period is to start based on a snap detection on some of the first memory cells having snapped from a reset state to a set state.

Example 7 includes the subject matter of Example 1, the one or more processors to determine set memory cells and reset memory cells of respective ones of the first memory cells and the second memory cells based on corresponding ones of the set pre-read operation and the reset pre-read operation.

Example 8 includes the subject matter of Example 1, the one or more processors to, at an end of the set pre-read time period, cause application of a selection current through reset memory cells of the first memory cells, and refrain from causing application of a current through at least some set memory cells of the first memory cells.

Example 9 includes the subject matter of Example 1, the one or more processors to, at an end of the reset pre-read time period, cause application of a current through set memory cells of the second memory cells, and refrain from causing application of a current through reset memory cells of the first memory cells.

Example 10 includes the subject matter of Example 1, wherein the set pre-read time period and the reset pre-read time periods are based on a clock cycle of the apparatus.

Example 11 includes a system comprising: a memory array including bitlines (BLs), wordlines (WLs), first memory cells and second memory cells, the first memory cells and the second memory cells coupled between the BLs and the WLs; control circuitry including a bitline (BL) voltage source to supply a bias to the BLs, a wordline (WL) voltage source to apply a bias to the WLs, and control circuitry to control the BL voltage source and the WL voltage source; and a memory controller including one or more processors coupled to the control circuitry to: in response to a determination of a set command to be implemented on first memory cells of the memory array, control an execution of a set pre-read operation on the first memory cells by causing application, by one of the BL voltage source or the WL voltage source, of a first demarcation voltage VDM0 across each of the first memory cells during a set pre-read time period; and in response to a determination of a reset command to implemented on second memory cells of the memory array, control an execution of a reset pre-read operation on the second memory cells by causing application, by the BL voltage source and the WL voltage source, of a second demarcation voltage VDM3 across each of the second memory cells during a reset pre-read time period, wherein the set pre-read time period and the reset pre-read time period do not overlap, the voltage source to supply a single voltage value at any given time.

Example 12 includes the subject matter of Example 11, wherein the memory controller is to refrain from causing current to flow through the second memory cells at least during the set pre-read time period.

Example 13 includes the subject matter of Example 11, the one or more processors to cause the application of VDM0 and the application of VDM3 by way of the WL voltage source, the memory array including, for each of the first memory cells and each of the second memory cells, a single transistor coupled to a corresponding one of the WLs in order to apply VDM0 across said each of the first memory cells and VDM3 across said each of the second memory cells, wherein the WL voltage source is coupled to the single transistor associated with each of the WLs.

Example 14 includes the subject matter of Example 13, wherein the first memory cells and the second memory cells are part of a same memory partition of the system, and wherein the WL voltage source is to supply bias to all memory cells of the partition.

Example 15 includes the subject matter of Example 11, wherein the reset pre-read time period is to start based on a snap detection on some of the first memory cells having snapped from a reset state to a set state.

Example 16 includes the subject matter of Example 11, the one or more processors to determine set memory cells and reset memory cells of respective ones of the first memory cells and the second memory cells based on corresponding ones of the set pre-read operation and the reset pre-read operation.

Example 17 includes the subject matter of Example 11, the one or more processors to, at an end of the set pre-read time period, cause application of a selection current through reset memory cells of the first memory cells, and refrain from causing application of a current through at least some set memory cells of the first memory cells.

Example 18 includes the subject matter of Example 11, the one or more processors to, at an end of the reset pre-read time period, cause application of a current through set memory cells of the second memory cells, and refrain from causing application of a current through reset memory cells of the first memory cells.

Example 19 includes the subject matter of Example 11, wherein the set pre-read time period and the reset pre-read time periods are based on a clock cycle of the system.

Example 20 includes a method to be performed on a memory array of a three-dimensional memory device, the method including: in response to a determination of a set command to be implemented on first memory cells of a memory array of the memory device, controlling an execution of a set pre-read operation on the first memory cells by causing application, by a voltage source, of a first demarcation voltage VDM0 across each of the first memory cells during a set pre-read time period; and in response to a determination of a reset command to implemented on second memory cells of the memory array, controlling an execution of a reset pre-read operation on the second memory cells by causing application, by the voltage source, of a second demarcation voltage VDM3 across each of the second memory cells during a reset pre-read time period, wherein the set pre-read time period and the reset pre-read time period do not overlap, the voltage source to supply a single voltage value at any given time.

Example 21 includes the subject matter of Example 20, further including refraining from causing current to flow through the second memory cells at least during the set pre-read time period.

Example 22 includes the subject matter of Example 20, further including causing the voltage source to supply a bias to a single transistor of each of respective wordlines of the first memory cells and the second memory cells in order to apply VDM0 across each of the first memory cells and VDM3 across each of the second memory cells.

Example 23 includes the subject matter of Example 20, wherein the first memory cells and the second memory cells are part of a same partition of the memory device, and wherein the voltage source is to supply bias to all memory cells of the partition.

Example 24 includes the subject matter of Example 20, further including causing a start of the reset pre-read time period based on a snap detection on some of the first memory cells having snapped from a reset state to a set state.

Example 25 includes the subject matter of Example 20, further including determining set memory cells and reset memory cells of respective ones of the first memory cells and the second memory cells based on corresponding ones of the set pre-read operation and the reset pre-read operation.

Example 26 includes the subject matter of Example 20, further including, at an end of the set pre-read time period, causing application of a selection current through reset memory cells of the first memory cells, and refraining from causing application of a current through at least some set memory cells of the first memory cells.

Example 27 includes the subject matter of Example 20, further including, at an end of the reset pre-read time period, causing application of a current through set memory cells of the second memory cells, and refrain from causing application of a current through reset memory cells of the first memory cells.

Example 28 includes the subject matter of Example 20, wherein the set pre-read time period and the reset pre-read time periods are based on a clock cycle of the memory device.

Example 29 includes a non-transitory machine readable storage medium having instructions stored thereon, the instructions when executed by a machine to cause the machine to perform operations including: in response to a determination of a set command to be implemented on first memory cells of a memory array, controlling an execution of a set pre-read operation on the first memory cells by causing application, by a voltage source, of a first demarcation voltage VDM0 across each of the first memory cells during a set pre-read time period; and in response to a determination of a reset command to implemented on second memory cells of the memory array, controlling an execution of a reset pre-read operation on the second memory cells by causing application, by the voltage source, of a second demarcation voltage VDM3 across each of the second memory cells during a reset pre-read time period, wherein the set pre-read time period and the reset pre-read time period do not overlap, the voltage source to supply a single voltage value at any given time.

Example 30 includes the subject matter of Example 29, the operations further including refraining from causing current to flow through the second memory cells at least during the set pre-read time period.

Example 31 includes the subject matter of Example 30, the operations further including causing the voltage source to supply a bias to a single transistor of each of respective wordlines of the first memory cells and the second memory cells in order to apply VDM0 across each of the first memory cells and VDM3 across each of the second memory cells.

Example 32 includes the subject matter of Example 29, wherein the first memory cells and the second memory cells are part of a same partition of a memory device including the memory array, and wherein the voltage source is to supply bias to all memory cells of the partition.

Example 33 includes the subject matter of Example 29, the operations further including causing a start of the reset pre-read time period based on a snap detection on some of the first memory cells having snapped from a reset state to a set state.

Example 34 includes the subject matter of Example 29, the operations further including determining set memory cells and reset memory cells of respective ones of the first memory cells and the second memory cells based on corresponding ones of the set pre-read operation and the reset pre-read operation.

Example 35 includes the subject matter of Example 29, the operations further including, at an end of the set pre-read time period, causing application of a selection current through reset memory cells of the first memory cells, and refraining from causing application of a current through at least some set memory cells of the first memory cells.

Example 36 includes the subject matter of Example 29, the operations further including, at an end of the reset pre-read time period, causing application of a current through set memory cells of the second memory cells, and refrain from causing application of a current through reset memory cells of the first memory cells.

Example 37 includes the subject matter of Example 29, wherein the set pre-read time period and the reset pre-read time periods are based on a clock cycle for the memory array.

Example 38 includes an apparatus to be coupled to a memory array of a memory device, the apparatus including: means for, in response to a determination of a set command to be implemented on first memory cells of the memory array, controlling an execution of a set pre-read operation on the first memory cells by causing application, by a voltage source, of a first demarcation voltage VDM0 across each of the first memory cells during a set pre-read time period; and means for, in response to a determination of a reset command to implemented on second memory cells of the memory array, controlling an execution of a reset pre-read operation on the second memory cells by causing application, by the voltage source, of a second demarcation voltage VDM3 across each of the second memory cells during a reset pre-read time period, wherein the set pre-read time period and the reset pre-read time period do not overlap, the voltage source to supply a single voltage value at any given time.

Example 39 includes the subject matter of Example 38, further including means for refraining from causing current to flow through the second memory cells at least during the set pre-read time period.

Example 40 includes the subject matter of Example 39, further including means for causing the voltage source to supply a bias to a single transistor of each of respective wordlines of the first memory cells and the second memory cells in order to apply VDM0 across each of the first memory cells and VDM3 across each of the second memory cells.

Example 41 includes the subject matter of Example 38, wherein the first memory cells and the second memory cells are part of a same partition of the memory device, and wherein the voltage source is to supply bias to all memory cells of the partition.

Example 42 includes the subject matter of Example 38, further including means for causing a start of the reset pre-read time period based on a snap detection on some of the first memory cells having snapped from a reset state to a set state.

Example 43 includes the subject matter of Example 38, further including means for determining set memory cells and reset memory cells of respective ones of the first memory cells and the second memory cells based on corresponding ones of the set pre-read operation and the reset pre-read operation.

Example 44 includes the subject matter of Example 38, further including means for, at an end of the set pre-read time period, causing application of a selection current through reset memory cells of the first memory cells, and refraining from causing application of a current through at least some set memory cells of the first memory cells.

Example 45 includes the subject matter of Example 38, further including means for, at an end of the reset pre-read time period, causing application of a current through set memory cells of the second memory cells, and refrain from causing application of a current through reset memory cells of the first memory cells.

Example 46 includes the subject matter of Example 38, wherein the set pre-read time period and the reset pre-read time periods are based on a clock cycle of the apparatus.

Example 47 includes an device comprising: one or more processors and one or more computer-readable media comprising instructions that, when executed by the one or more processors, cause the one or more processors to perform the method, techniques, or process as described in or related to any of the Examples above, or portions thereof.

Example 48 includes a signal as described in or related to any of the Examples above, or portions or parts thereof.

Example 49 includes a datagram, packet, frame, segment, protocol data unit (PDU), or message as described in or related to any of the Examples above, or portions or parts thereof, or otherwise described in the present disclosure.

Example 50 includes a signal encoded with data as described in or related to any of the Examples above, or portions or parts thereof, or otherwise described in the present disclosure.

Example 51 includes a signal encoded with a datagram, packet, frame, segment, protocol data unit (PDU), or message as described in or related to any of the Examples above, or portions or parts thereof, or otherwise described in the present disclosure.

Example 52 includes an electromagnetic signal carrying computer-readable instructions, wherein execution of the computer-readable instructions by one or more processors is to cause the one or more processors to perform the method, techniques, or process as described in or related to any of the Examples above, or portions thereof.

Example 53 includes a computer program comprising instructions, wherein execution of the program by a processing element is to cause the processing element to carry out the method, techniques, or process as described in or related to any of the Examples above, or portions thereof.

Example 54 includes means for performing the method according to any one of the Examples methods listed above, or to any other processes according to embodiments.

Reference throughout this specification to "one embodiment" or "an embodiment" means that a particular feature, structure, or characteristic described in connection with the embodiment is included in at least one embodiment of the present disclosure. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

In the foregoing specification, a detailed description has been given with reference to specific exemplary embodiments. It will, however, be evident that various modifications and changes may be made thereto without departing from the broader spirit and scope of the disclosure as set forth in the appended claims. The specification and drawings are, accordingly, to be regarded in an illustrative sense rather than a restrictive sense. Furthermore, the foregoing use of embodiment and other exemplarily language does not necessarily refer to the same embodiment or the same example, but may refer to different and distinct embodiments, as well as potentially the same embodiment.

What is claimed is:

1. An apparatus to be coupled to a memory array of a memory device, the apparatus including one or more processors to:
    in response to a determination of a set command to be implemented on first memory cells of the memory array, control an execution of a set pre-read operation on the first memory cells by causing application, by a voltage source, of a first demarcation voltage VDM0 across each of the first memory cells during a set pre-read time period; and
    in response to a determination of a reset command to implemented on second memory cells of the memory array, control an execution of a reset pre-read operation on the second memory cells by causing application, by the voltage source, of a second demarcation voltage VDM3 across each of the second memory cells during a reset pre-read time period, wherein the set pre-read time period and the reset pre-read time period do not overlap, the voltage source to supply a single voltage value at any given time.

2. The apparatus of claim 1, wherein the one or more processors are to refrain from causing current to flow through the second memory cells at least during the set pre-read time period.

3. The apparatus of claim 1, further including the voltage source, the voltage source coupled to one of wordlines or bitlines of both the first memory cells and the second memory cells.

4. The apparatus of claim 3, wherein the voltage source is coupled to wordlines of the first memory cells and the second memory cells, and wherein, for each of the first memory cells and each of the second memory cells, the voltage source is to supply a bias to a single transistor of a corresponding one of the wordlines in order to apply VDM0 across said each of the first memory cells and VDM3 across said each of the second memory cells.

5. The apparatus of claim 1, wherein the first memory cells and the second memory cells are part of a same partition of the memory device, and wherein the voltage source is to supply bias to all memory cells of the partition.

6. The apparatus of claim 1, wherein the reset pre-read time period is to start based on a snap detection on some of the first memory cells having snapped from a reset state to a set state.

7. The apparatus of claim 1, the one or more processors to determine set memory cells and reset memory cells of respective ones of the first memory cells and the second memory cells based on corresponding ones of the set pre-read operation and the reset pre-read operation.

8. The apparatus of claim 1, the one or more processors to, at an end of the set pre-read time period, cause application of a selection current through reset memory cells of the first memory cells, and refrain from causing application of a current through at least some set memory cells of the first memory cells.

9. The apparatus of claim 1, the one or more processors to, at an end of the reset pre-read time period, cause application of a current through set memory cells of the second memory cells, and refrain from causing application of a current through reset memory cells of the first memory cells.

10. The apparatus of claim 1, wherein the set pre-read time period and the reset pre-read time period are based on a clock cycle of the apparatus.

11. A system comprising:
a memory array including bitlines (BLs), wordlines (WLs), first memory cells and second memory cells, the first memory cells and the second memory cells coupled between the BLs and the WLs;
control circuitry including a bitline (BL) voltage source to supply a bias to the BLs, a wordline (WL) voltage source to apply a bias to the WLs, and control circuitry to control the BL voltage source and the WL voltage source; and
a memory controller including one or more processors coupled to the control circuitry to:
in response to a determination of a set command to be implemented on first memory cells of the memory array, control an execution of a set pre-read operation on the first memory cells by causing application, by one of the BL voltage source or the WL voltage source, of a first demarcation voltage VDM0 across each of the first memory cells during a set pre-read time period; and
in response to a determination of a reset command to implemented on second memory cells of the memory array, control an execution of a reset pre-read operation on the second memory cells by causing application, by the BL voltage source and the WL voltage source, of a second demarcation voltage VDM3 across each of the second memory cells during a reset pre-read time period, wherein the set pre-read time period and the reset pre-read time period do not overlap, any of the BL voltage source or the WL voltage source to supply a single voltage value at any given time.

12. The system of claim 11, wherein the memory controller is to refrain from causing current to flow through the second memory cells at least during the set pre-read time period.

13. The system of claim 11, the one or more processors to cause the application of VDM0 and the application of VDM3 by way of the WL voltage source, the memory array including, for each of the first memory cells and each of the second memory cells, a single transistor coupled to a corresponding one of the WLs in order to apply VDM0 across said each of the first memory cells and VDM3 across said each of the second memory cells, wherein the WL voltage source is coupled to the single transistor associated with each of the WLs.

14. A non-transitory machine readable storage medium having instructions stored thereon, the instructions when executed by a machine to cause the machine to perform operations including:

in response to a determination of a set command to be implemented on first memory cells of a memory array, controlling an execution of a set pre-read operation on the first memory cells by causing application, by a voltage source, of a first demarcation voltage VDM0 across each of the first memory cells during a set pre-read time period; and
in response to a determination of a reset command to implemented on second memory cells of the memory array, controlling an execution of a reset pre-read operation on the second memory cells by causing application, by the voltage source, of a second demarcation voltage VDM3 across each of the second memory cells during a reset pre-read time period, wherein the set pre-read time period and the reset pre-read time period do not overlap, the voltage source to supply a single voltage value at any given time.

15. The storage medium of claim 14, the operations further including refraining from causing current to flow through the second memory cells at least during the set pre-read time period.

16. The storage medium of claim 15, the operations further including causing the voltage source to supply a bias to a single transistor of each of respective wordlines of the first memory cells and the second memory cells in order to apply VDM0 across each of the first memory cells and VDM3 across each of the second memory cells.

17. The storage medium of claim 14, wherein the first memory cells and the second memory cells are part of a same partition of a memory device including the memory array, and wherein the voltage source is to supply bias to all memory cells of the partition.

18. The storage medium of claim 14, the operations further including causing a start of the reset pre-read time period based on a snap detection on some of the first memory cells having snapped from a reset state to a set state.

19. The storage medium of claim 14, the operations further including determining set memory cells and reset memory cells of respective ones of the first memory cells and the second memory cells based on corresponding ones of the set pre-read operation and the reset pre-read operation.

20. The storage medium of claim 14, the operations further including, at an end of the set pre-read time period, causing application of a selection current through reset memory cells of the first memory cells, and refraining from causing application of a current through at least some set memory cells of the first memory cells.

* * * * *